United States Patent
Bagheri et al.

(10) Patent No.: US 8,724,934 B2
(45) Date of Patent: May 13, 2014

(54) MULTI-MODE MULTIPLEXING USING STAGED COUPLING AND QUASI-PHASE-MATCHING

(75) Inventors: Saeed Bagheri, Yorktown Heights, NY (US); William M. Green, Yorktown Heights, NY (US); Petar Pepeljugoski, Yorktown Heights, NY (US); Yurii A. Vlasov, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/608,281

(22) Filed: Sep. 10, 2012

(65) Prior Publication Data
US 2012/0330625 A1    Dec. 27, 2012

Related U.S. Application Data

(62) Division of application No. 12/552,387, filed on Sep. 2, 2009, now Pat. No. 8,363,987.

(51) Int. Cl.
*G02F 1/035*    (2006.01)

(52) U.S. Cl.
USPC .................................................. 385/3; 385/14

(58) Field of Classification Search
USPC ............................................................ 385/3
See application file for complete search history.

(56) References Cited

U.S. PATENT DOCUMENTS

| | | | |
|---|---|---|---|
| 5,995,691 A | 11/1999 | Arai et al. |
| 6,219,471 B1 | 4/2001 | Doerr |
| 6,643,419 B2 | 11/2003 | Chang et al. |
| 6,687,425 B2 | 2/2004 | Ridgway et al. |
| 7,184,623 B2 | 2/2007 | Cai et al. |
| 7,212,712 B2 | 5/2007 | Ramadan |
| 7,469,084 B2 | 12/2008 | Aalto |
| 7,853,108 B2 | 12/2010 | Popovic et al. |

OTHER PUBLICATIONS

Greenberg et al., "Multimode add-drop multiplexing by adiabatic linearly tapered coupling", Nov. 14, 2005, vol. 13, No. 23, Optics Express 9381.

*Primary Examiner* — Eric Wong
(74) *Attorney, Agent, or Firm* — Scully, Scott, Murphy & Presser, P.C.; Vazken Alexanian

(57) ABSTRACT

A mode-selective add/drop unit for a mode division de-/multiplexing device includes an optical ADU waveguide adapted for coupling to an input optical waveguide. The optical ADU waveguide includes at least one region providing optical signal coupling between the ADU waveguide and a multi-mode waveguide; and, one or more phase matching regions for controlling a relative or absolute phase difference between an electromagnetic wave (EMW) carried in the ADU waveguide and the multi-mode waveguide. The mode-selective add/drop unit may further include a transition region connecting the coupling region and a phase matching region, wherein a shape of a transition region is governed by a polynomial function, exponential function, logarithmic function, trigonometric function or, any combination of these functions.

11 Claims, 18 Drawing Sheets

MULTI-MODE MULTIPLEXING USING STAGED COUPLING AND QUASI-PHASE-MATCHING

CROSS REFERENCE TO RELATED APPLICATION

This application is a divisional of U.S. patent application Ser. No. 12/552,387, filed on Sep. 2, 2009 the entire content and disclosure of which is incorporated herein by reference.

BACKGROUND

Electro-optical devices such as switches and modulators are a key component of current communication systems. On-chip integrated electro-optical devices are becoming an important part of future processors. These devices are required to transfer high density of signals across many processing cores reliably and fast. Another example of potential impact in future processors is the possibility of electro-optical logics. The functionality of many key components of such devices (e.g. modulators, switches etc.) has been demonstrated.

A key part of any integrated optical device is a medium for signal transfer from one location to another across the chip. Usually rectangular waveguides are used for this purpose. Specifically, the signal is transferred using the fundamental mode of these waveguides. Often, these waveguides are designed to accommodate signals with multiple wavelengths at the same time. This means one can transfer/input/output two or more signals in parallel using a single waveguide. Even then, the number of feasible parallel information routes is limited by the spectral response of the waveguide. Should one require more parallel data channels than what fits within a single waveguide, then the simplest option is to add more waveguides. Adding more waveguide clearly occupies more space on the chip. Furthermore, considering the potential coupling effect between these waveguides, one has to position them fairly far apart which in turn adds to the space occupied on the chip.

Another approach for transferring signals truly in parallel across the chip is to use multi-mode waveguides. In this scenario, different signals are modulated in different modes of the multi-mode waveguide and then transferred across the chip. Each mode is still capable of carrying multiple signals with different wavelength. One can think of multi-mode waveguides as two dimensional information transport mediums in which one can not only send different signals with different wavelengths, but also one can send different signals with different modes. A multi-mode waveguide is hereinafter referred to by the term "bus."

The main challenge in the road map for using buses in integrated optical devices is the problem of multiplexing the signal from a waveguide that may be single-mode or multi-mode to a bus and de/multiplexing the signal from the bus back to the waveguide. A device that can accomplish this goal (i.e. add or drop a mode from/to a bus) is called a mode-division multiplexer (MDM). FIG. 1 shows a schematic view of two such devices 10a, 10b. In FIG. 1, in an example implementation, there is shown a bus 12 (e.g., a multi-mode waveguide) that can carry three modes labeled 1, 2, 3. Each MDM device is made of several components such as mode-selective add/drop units labeled $MSADU_1$, $MSADU_2$ and $MSADU_3$ that interact with the first, second and third mode of the bus, respectively. These components are called mode-selective add/drop units (MSADU). Component SW 15 acts as an on/off switch and is controlled with an electric or another optical signal. In one embodiment, the switch unit 15 decides which mode-selective add/drop unit should be on; and, if so whether it should activate or deactivate a particular MSADU as add or drop (by changing the photons flow direction of the optical signal). The design and operation of component SW 15 is known.

It would be highly desirable to provide a design for and optimization of MSADUs, namely components $MSADU_1$, $MSADU_2$ and $MSADU_3$ as shown in FIG. 1.

Recently, with the growing interest in on-chip integrated optical devices, there are several prior art designs for MSADUs. For example, in a recent proposed approach to MDM based on concept of multi-mode interference, the devices tend to suffer from very large area requirements (on the order of 0.05 $mm^2$), and, have a variable bus structure which may cause problems in matching the required tolerances across different core processors.

Another approach in designing MSADUs is direct adiabatic coupling between the waveguide and bus. These MSADUs have relatively smaller size (on the order of 0.01 $mm^2$) compared to the recent MDM approach supra, however, the size is still too large compared to other typical on-chip integrated electro-optical devices. Although in these designs they have assumed a uniform bus size, they modified the width and more importantly the height of the waveguides for different MSADUs. This causes many problems in usability of their approach in a real multi-core processor.

It would be highly desirable to provide an improved system and method for multiplexing signals from waveguides to an a bus.

SUMMARY

This invention relates to photonic devices and more particularly to a multi-mode division de/multiplex apparatus and method for de/multiplexing signals from waveguides to a bus, and vice versa, using staged coupling and quasi phase matching under the requirement of minimum cross talk between modes, low power loss, compactness and broad spectral response.

In one aspect, there is provided a mode division de/multiplexing device comprising: one or more mode-selective add-drop units in correspondence with one or more input optical waveguides, each input optical waveguide characterized by a fundamental mode at which optical signals carried are to be transferred; a switch to route the optical signal from an input optical waveguide to a mode-selective add-drop unit; and a bus in which optical signals are coupled to and from each mode-selective add-drop unit. Each mode-selective add-drop unit comprises: an optical ADU waveguide adapted for coupling to an input optical waveguide, the optical ADU waveguide having: at least one region providing optical signal coupling between the ADU waveguide and a multi-mode waveguide; and, one or more phase matching regions for controlling a phase difference between an electromagnetic wave (EMW) carried in the ADU waveguide and the multi-mode waveguide.

In a further aspect, there is provided a mode-selective add/drop unit for a mode division de/multiplexing device. The mode-selective add/drop unit comprises: an optical ADU waveguide adapted for coupling to an input optical waveguide, the optical ADU waveguide having: at least one region providing optical signal coupling between the ADU waveguide and a multi-mode waveguide; and, one or more phase matching regions for controlling a phase difference between an electromagnetic wave (EMW) carried in the ADU waveguide and the multi-mode waveguide.

In a further aspect of the invention, there is provided a method of designing a mode-selective add-drop unit (MSADU) having an optical ADU waveguide for coupling signals from an input optical waveguide to a general multi-mode waveguide, the optical ADU waveguide having a region for coupling said input optical waveguide, said method comprising: specifying a gap value $d_K$ between said optical ADU waveguide and said general multi-mode waveguide, a wavelength value $\lambda_l$ and, an allowable optical ADU waveguide width $\omega_a^x$; calculating one or more transfer matrices and propagation constants for modes in coupling regions and separation (or quasi phase matching) regions between said optical ADU waveguide and said general multi-mode waveguide; forming a representation of an output width of said ADU waveguide as a function of said calculated one or more transfer matrices and propagation constants for modes in coupling regions and separation (or quasi phase matching) regions; minimizing a value of said representation; calculating an optimum ADU waveguide width based on said minimized value; and, optimizing a profile of said coupling region of said ADU waveguide to preserve continuity in the width and at least a first derivative of said profile to minimize power loss. A program using a processor unit executes one or more of said calculating one or more transfer matrices and propagation constants, forming, minimizing, calculating ADU waveguide width, and optimizing.

According to a further aspect of the invention, there is provided a method of designing a mode-selective add-drop unit (MSADU) having an optical ADU waveguide for coupling signals from an input optical waveguide to a general multi-mode waveguide, said method comprising: specifying a gap value $d_K$ between said optical ADU waveguide and said general multi-mode waveguide, a wavelength value $\lambda_l$ and, an allowable optical ADU waveguide width $\omega_a^x$; calculating one or more transfer matrices and propagation constants for modes in coupling regions and separation (or quasi phase matching) regions between said optical ADU waveguide and said general multi-mode waveguide; forming a representation of a length $L_c$ of a staged coupling region and a length of a quasi phase matching region $L_t$ of said optical ADU waveguide as a function of said calculated one or more transfer matrices and propagation constants for modes in coupling regions and separation (or quasi phase matching) regions, said staged coupling and quasi phase matching region of said optical ADU waveguide for coupling an optical signal to said general multi-mode waveguide at a desired mode to said general multi-mode waveguide; and, calculating an optimum value of the staged coupling length $L_c$ and the quasi phase matching length $L_t$ based on a maximized power value to said desired mode of said multi-mode waveguide. A program using a processor unit executes one or more of said calculating one or more transfer matrices and propagation constants, forming, and calculating lengths $L_c$ and $L_t$.

The objects, features and advantages of the present invention will become apparent to one ordinary skill in the art, in view of the following detailed description taken in combination with the attached drawings, in which.

Figure 12A:
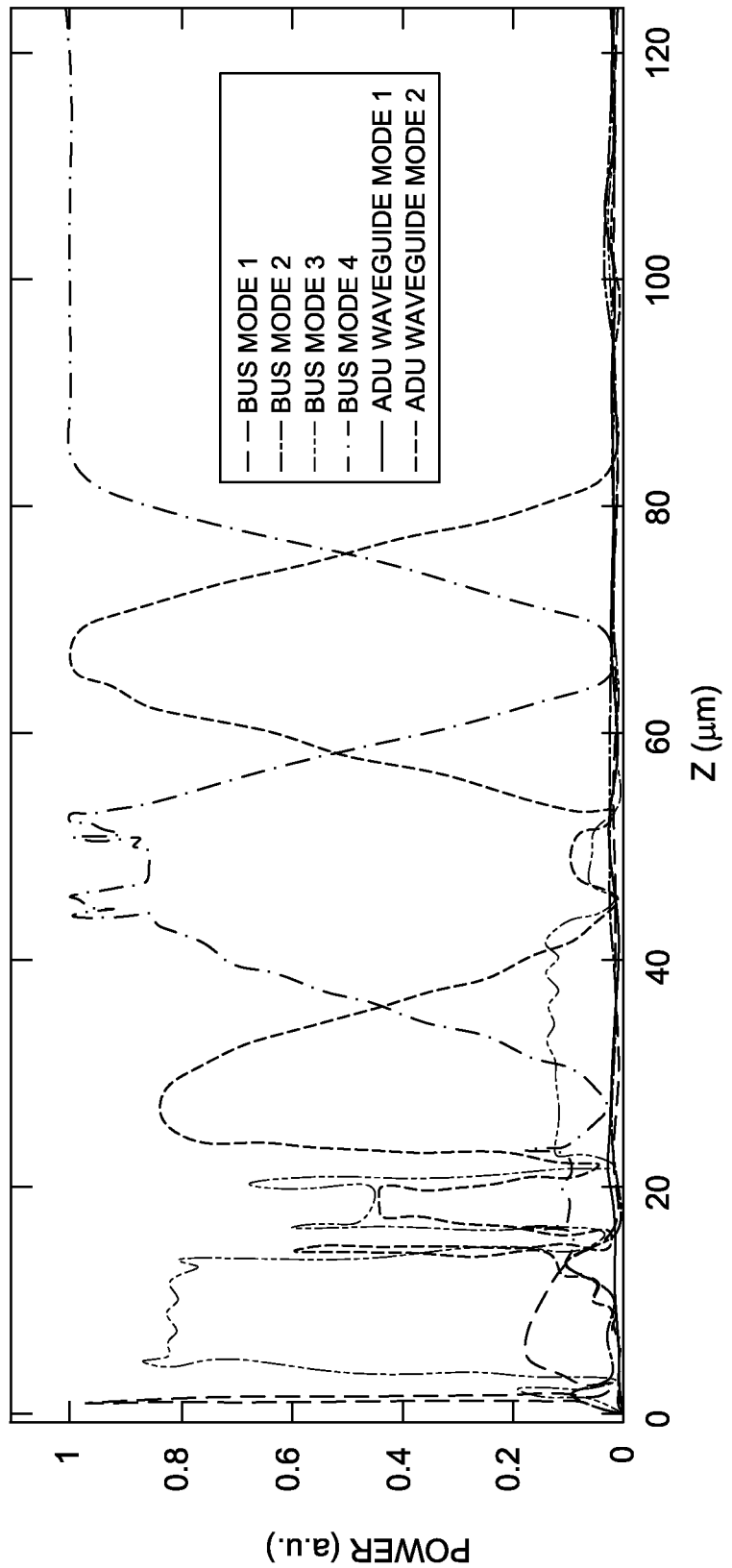
FIG. 12A is a plot showing the evolution of the power (in decimal scale) in various modes of the ADU waveguide and various modes of the bus along the MSADU device in an example application to transfer the power to the fourth mode of the bus, with FIG. 12B depicting a log plot of the power transfer showing the low cross-talk between modes.
Figure 12B:
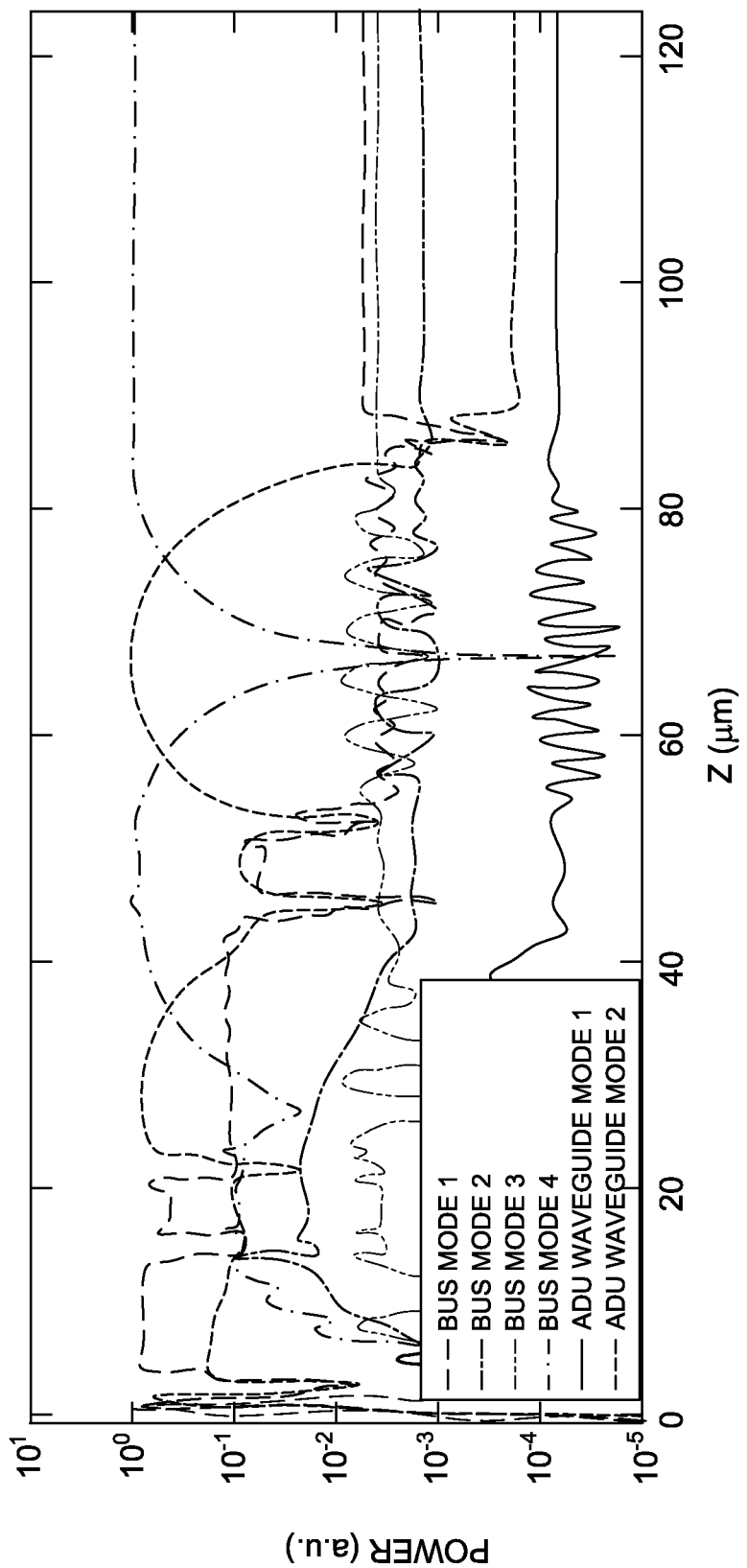
Figure 13A:
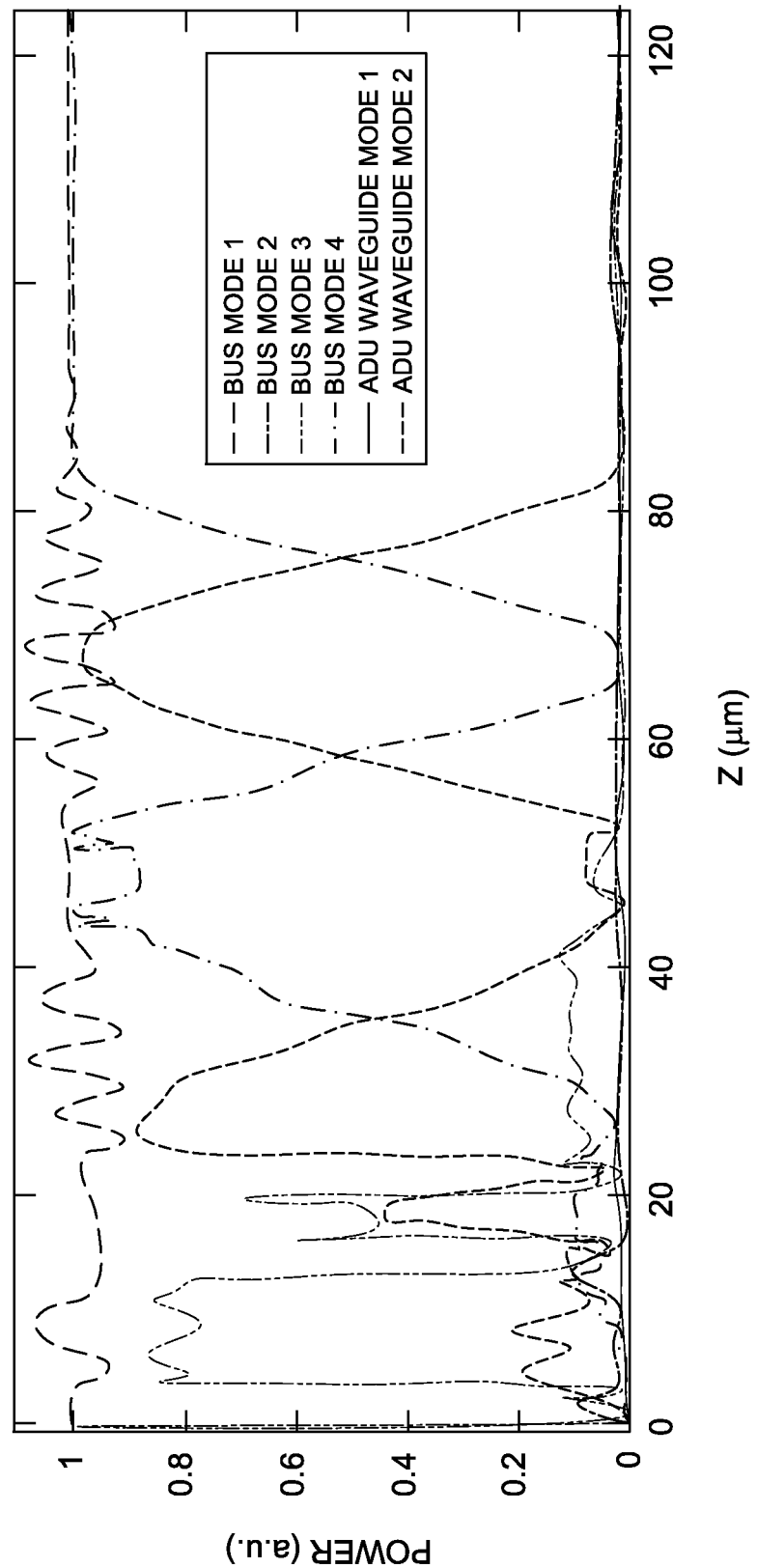
Figure 13B:
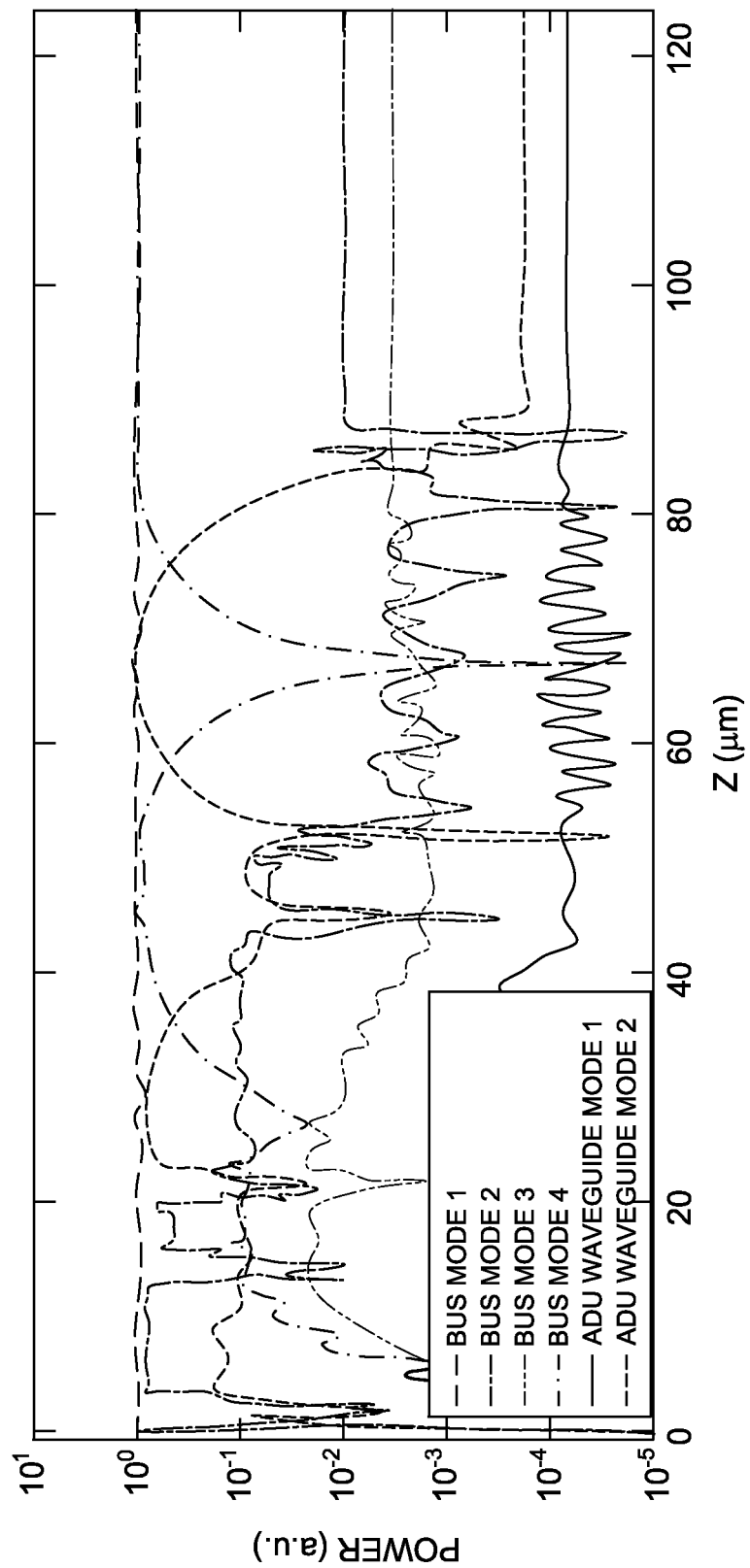
Figure 14A:
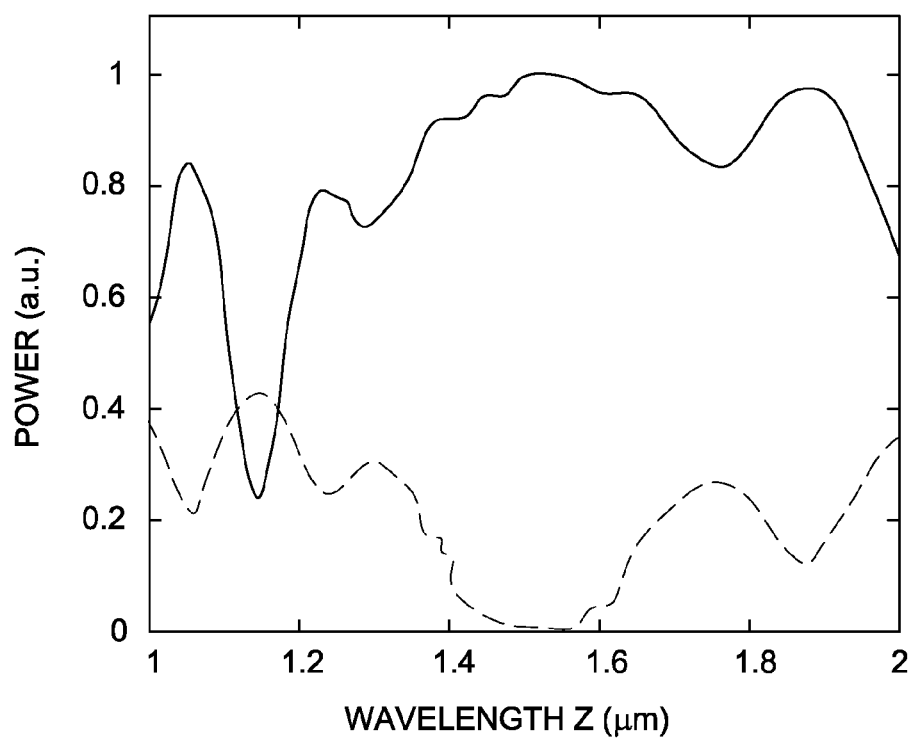
Figure 14B:
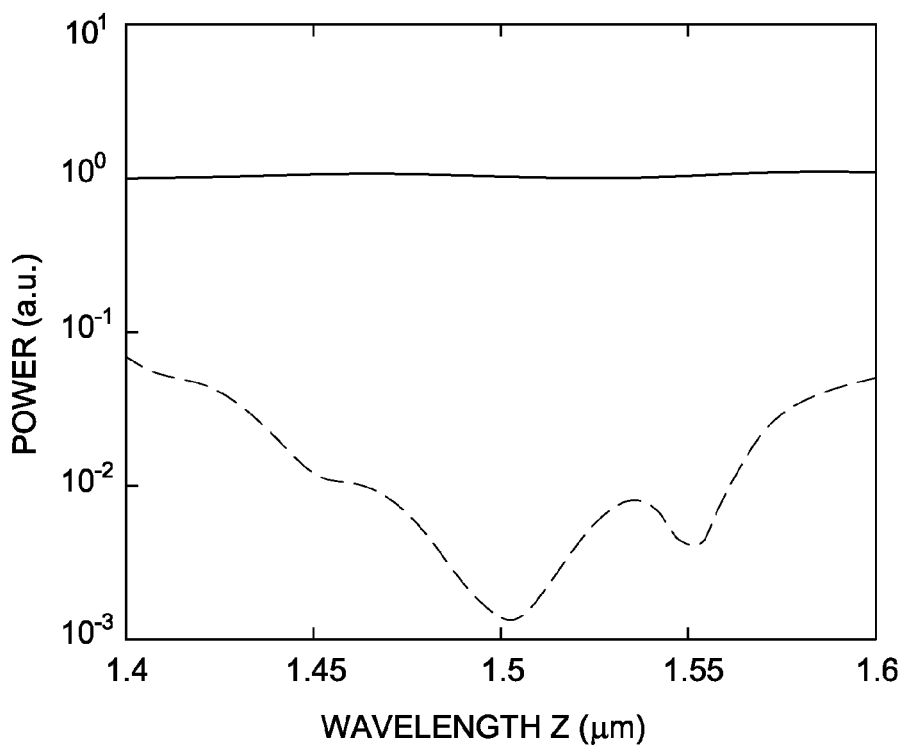
Figure 15:
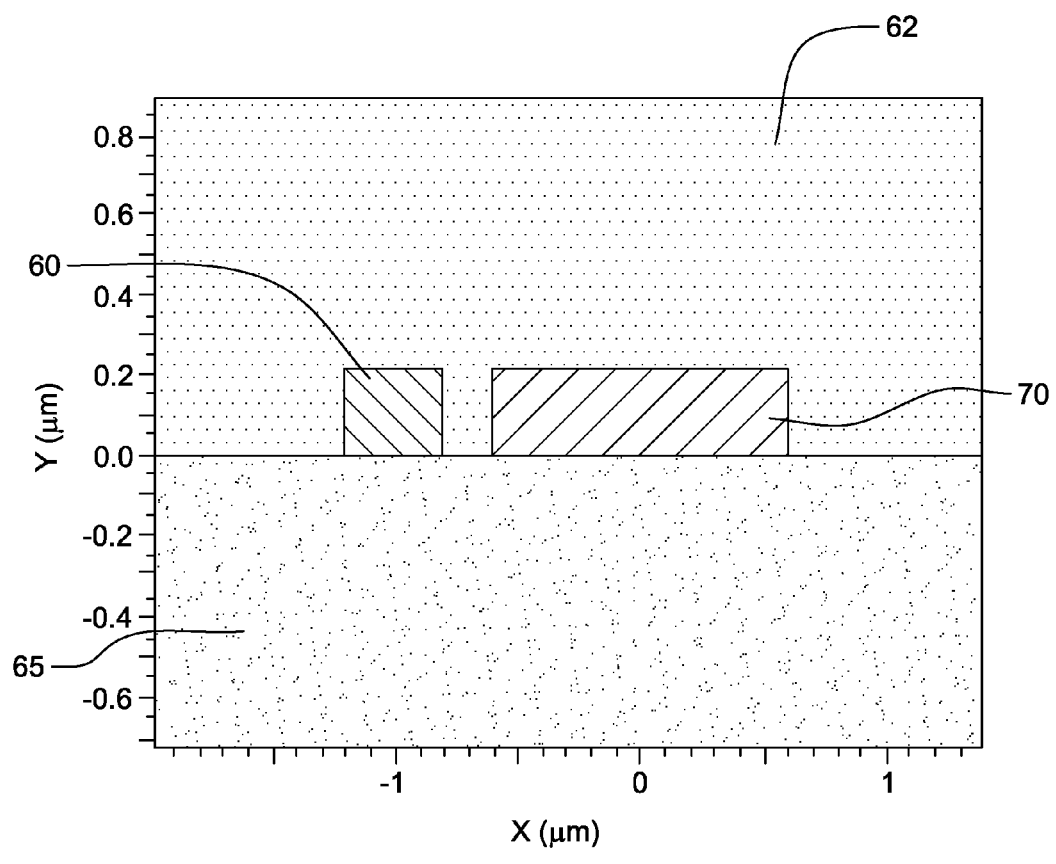
Figure 16:
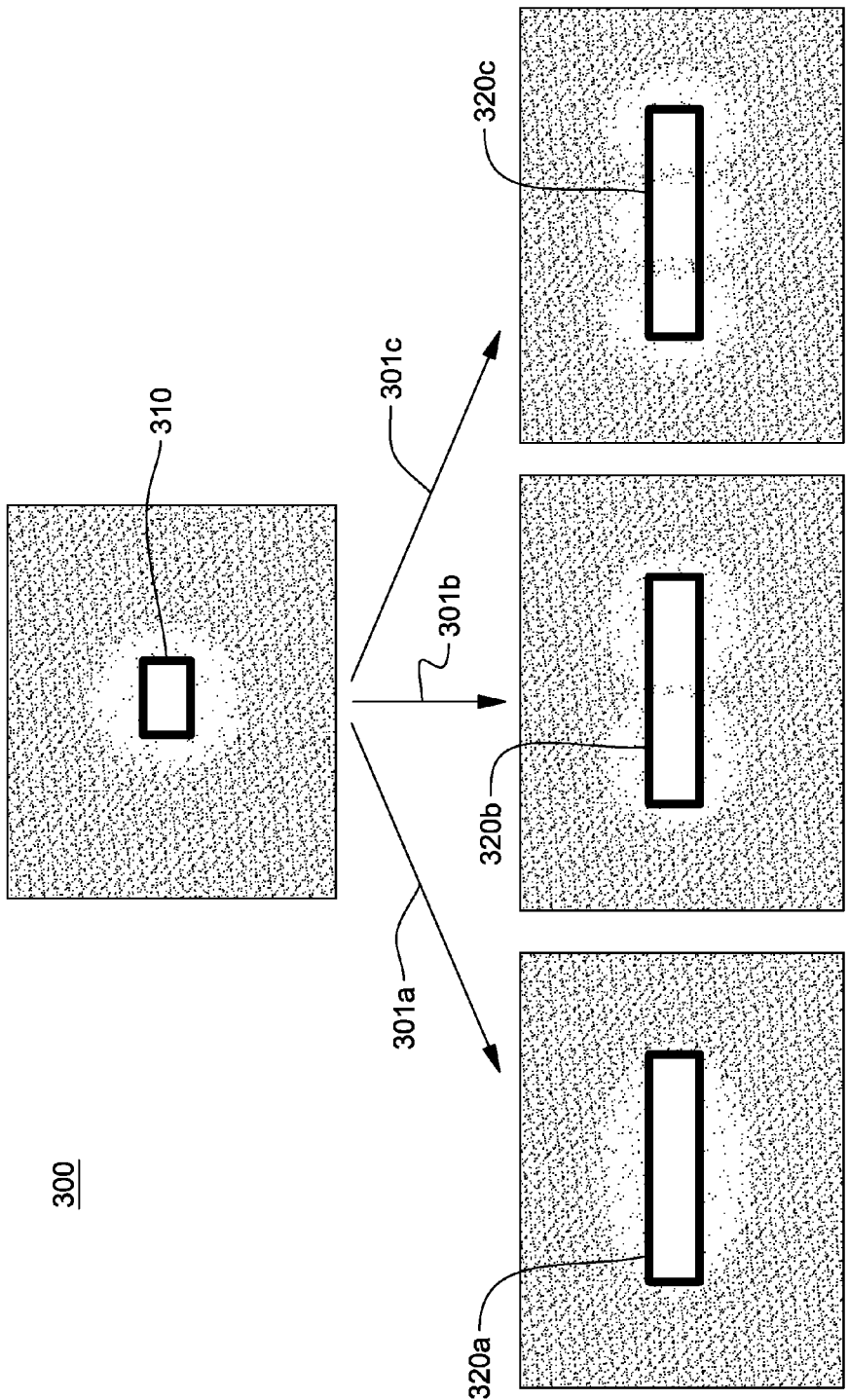
Figure 17:
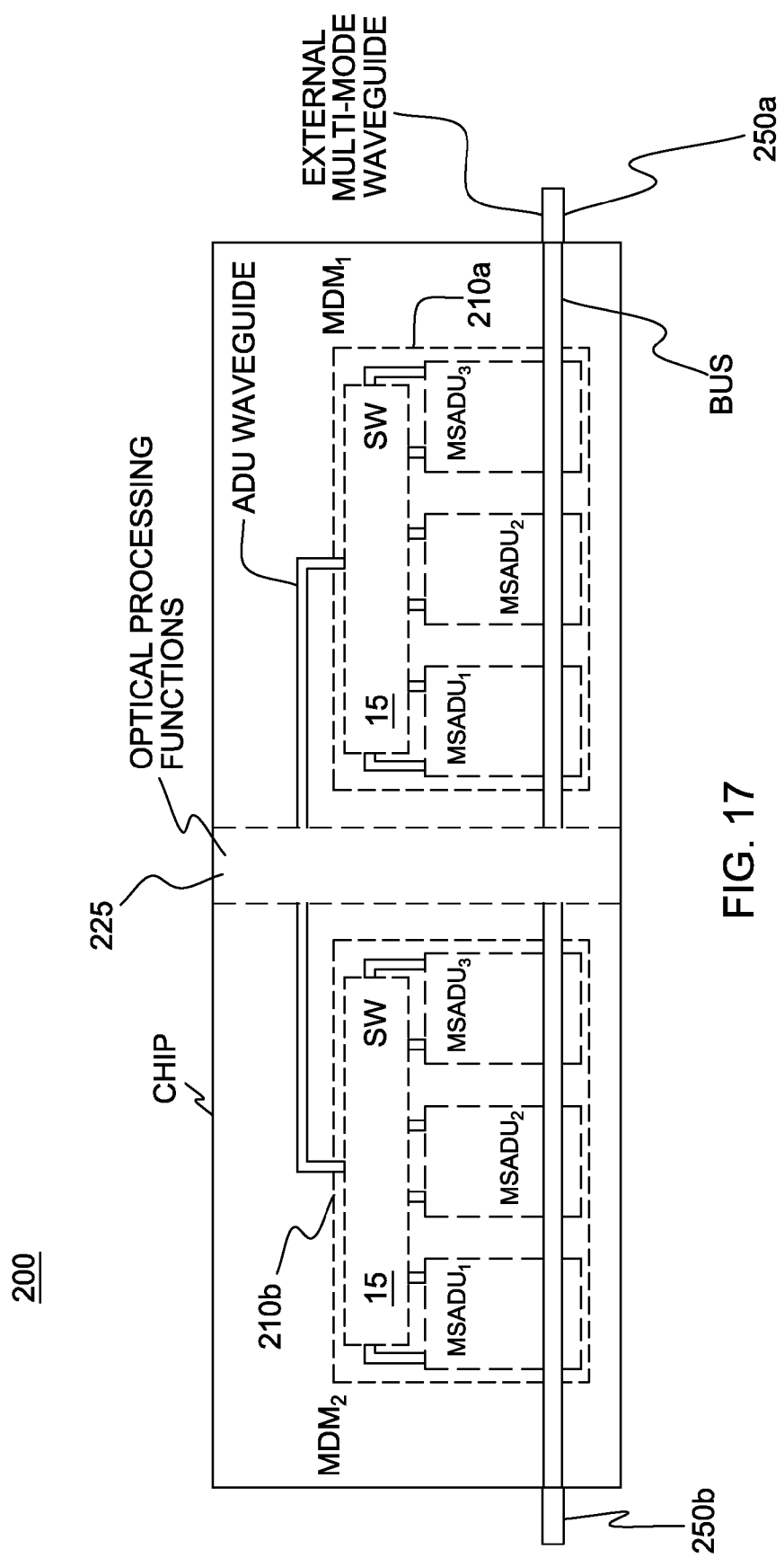
Figure 18:
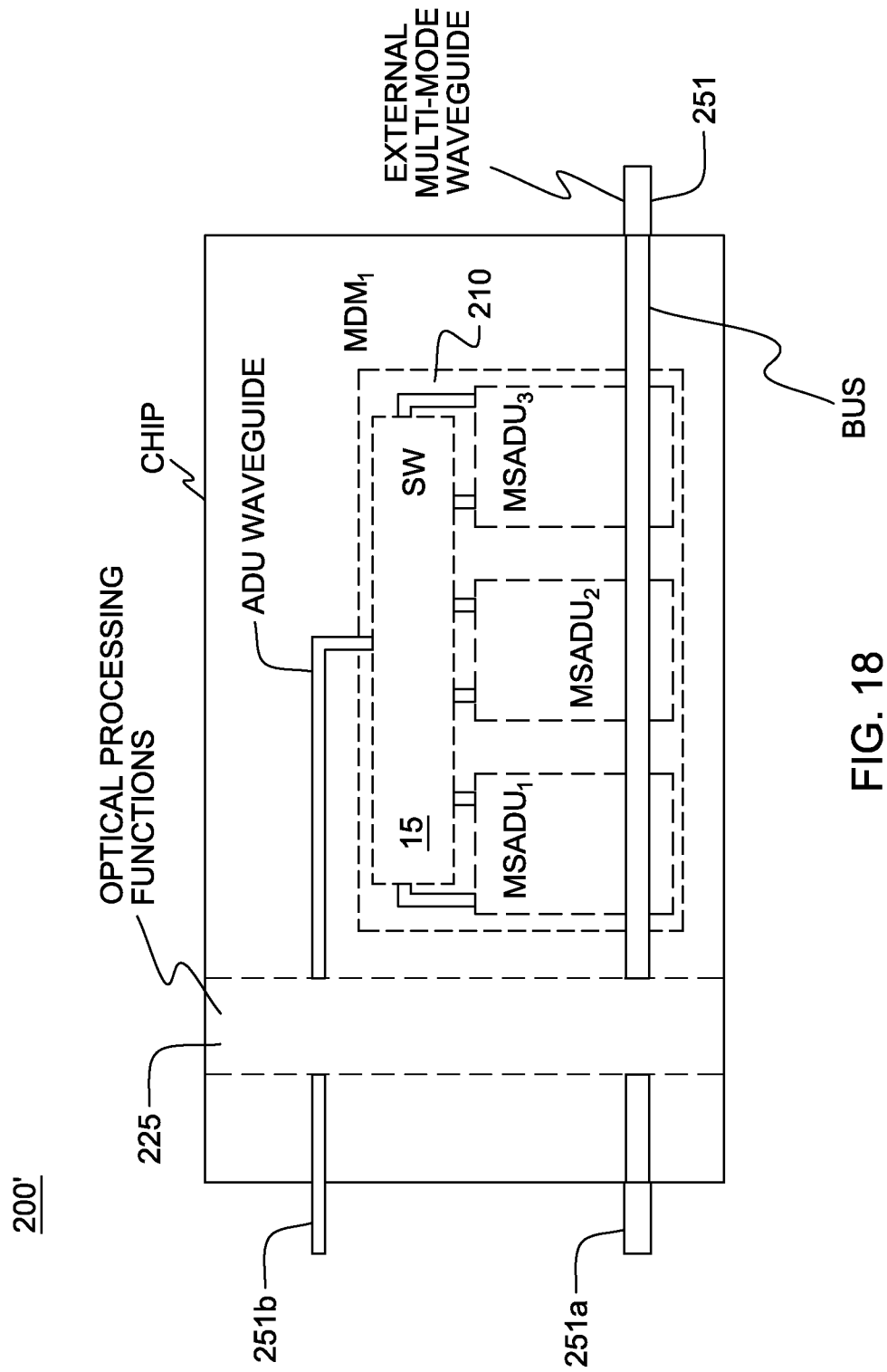
Figure 19:
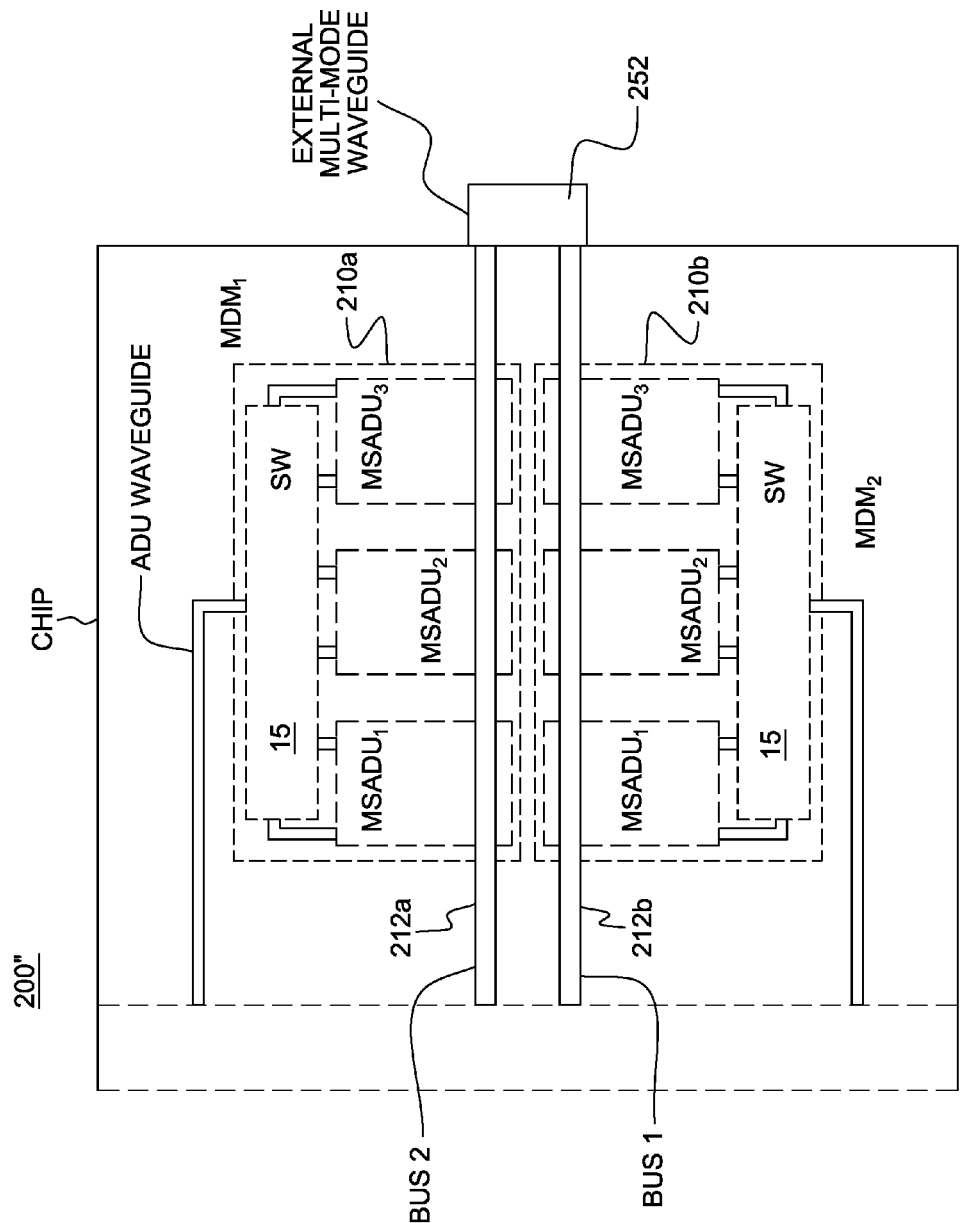
Figure 20:
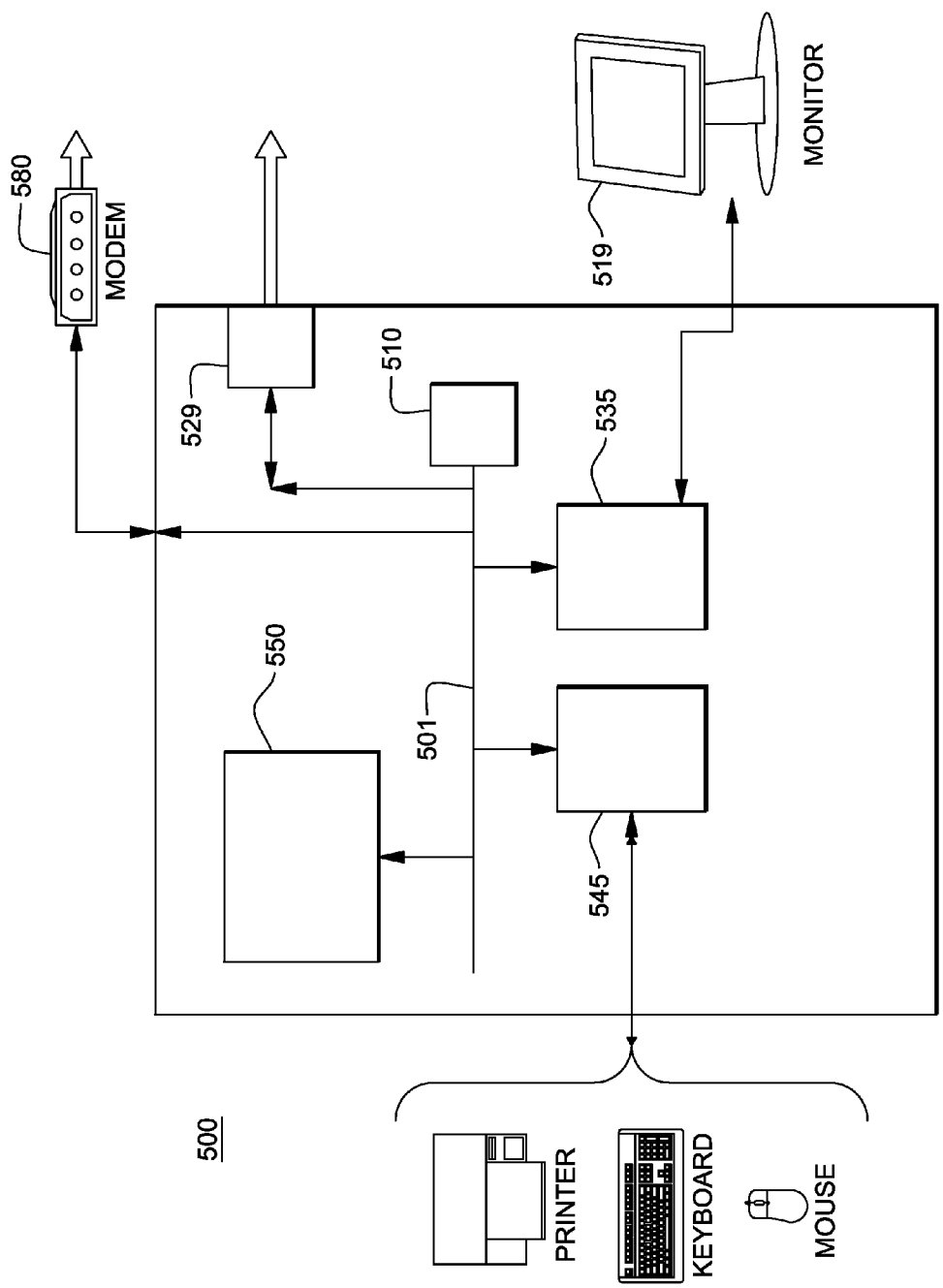

FIG. 13A is a plot showing the evolution of the power (in decimal scale) in various modes of the ADU waveguide and various modes of the bus along the MSADU device in an example application to transfer the power to the fourth mode of the bus when the bus is already carrying a signal, e.g., at a first bus mode, with FIG. 13B depicting a log plot of the power transfer showing the low cross-talk between modes;

FIG. 14A shows the spectral response (with powers shown in decimal scale) of the optimized MSADU device for the example design where total power transfer is between the input waveguide and the fourth mode of the bus as described with respect to FIGS. 12A, 12B; and, FIG. 14b shows the spectral response (with powers shown in log scale);

FIG. 15 shows a cross sectional view of a semiconductor device including ADU waveguide and bus waveguide together in the coupling region "c" or $r_1$;

FIG. 16 depicts an example application showing intensity distributions of a) the fundamental mode of the ADU waveguide (which is shown as single-mode for simplicity only), and b)-d) modes 1, 2, and 3 of the waveguide (which has three modes here for simplicity only);

FIG. 17 depicts an embodiment in which a MDM device employing the MSADU device is used as an interface device to a set of external multi-mode input/output waveguides according to an example embodiment;

FIG. 18 depicts an embodiment in which a MDM device employing the MSADU device is used as an interface device to a set of external multi-mode and/or single-mode input/output waveguides according to an example embodiment;

FIG. 19 depicts an embodiment in which an external multi-mode waveguide connects simultaneously to two different bus waveguides, each bus waveguide belonging to a separate mode-division multiplexing device; and, FIG. 20 depicts and exemplary computer system 500 that can be used for designing and optimizing an MSADU device including one or more processors or processing units, a system memory, and an address/data bus structure that connects various system components together.

DETAILED DESCRIPTION OF THE INVENTION

As described herein, the term "bus" refers to a general multi-mode optical waveguide. The novel mode-selective add/drop unit (MSADU) device in the present invention is reduced in size, and provides significantly increased coupling between the input waveguide and the mode of the bus to (from) which power transfer is desired. To achieve this goal, in one aspect of the invention, the MSADU device not only uses an intelligent structure design, but also it tunes several available design parameter based on the suggested structure.

Figure 1:
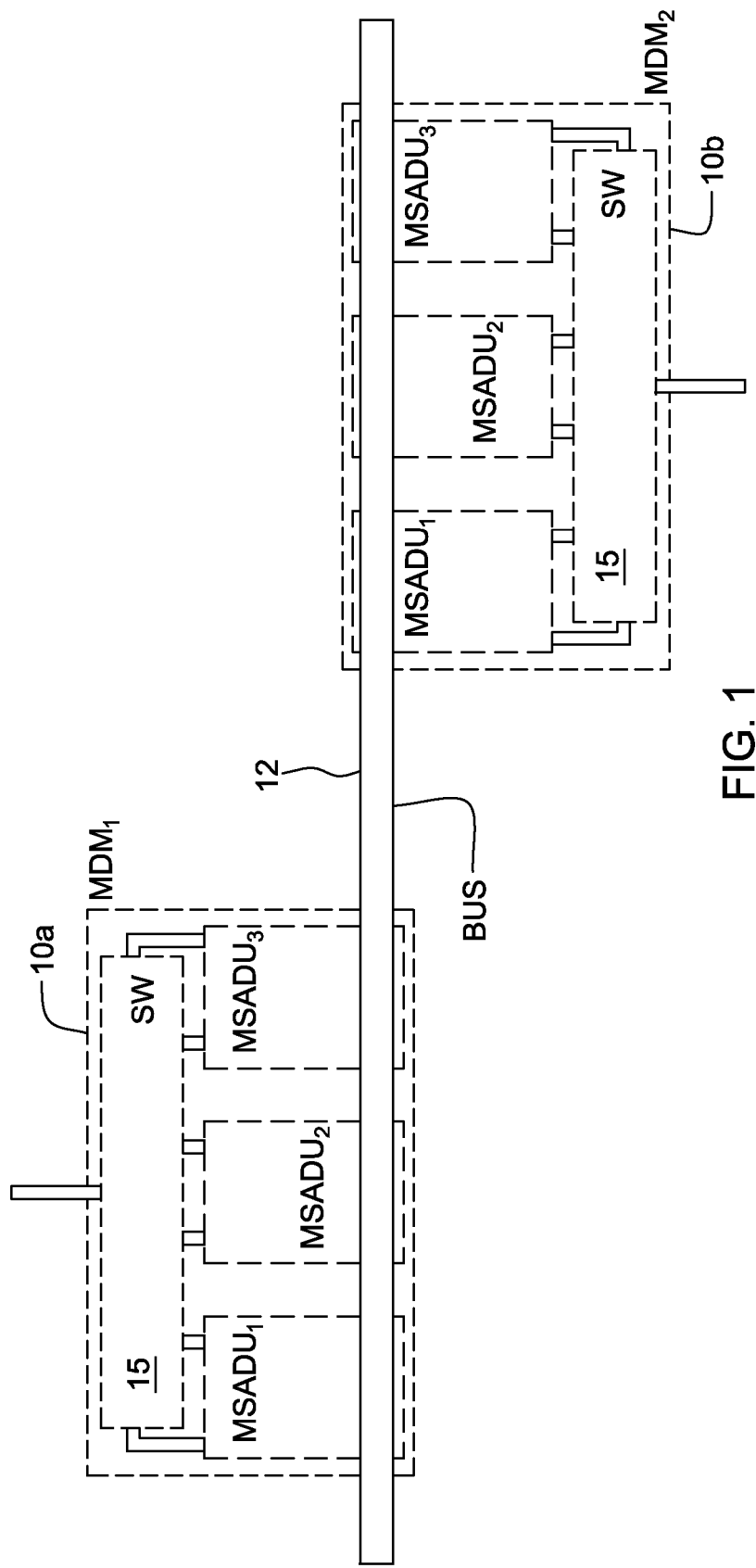
FIG. 1 illustrates a schematic view of a system employing mode division de/multiplexing (MDM) device according to a known designs.
Figure 2:
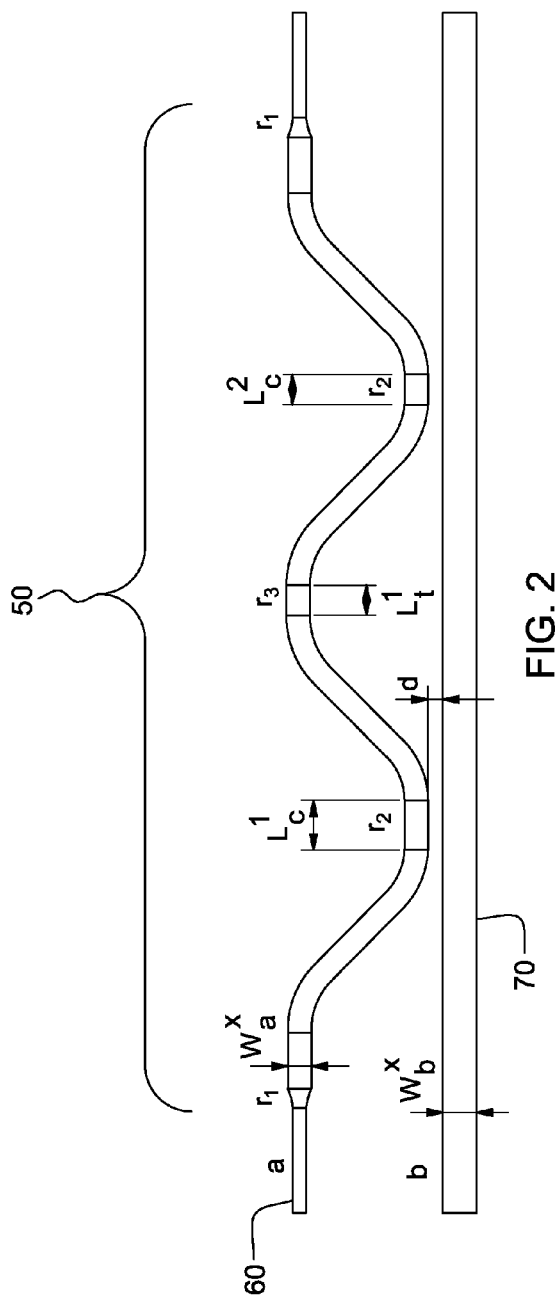
FIG. 2 illustrates an example schematic view of an MSADU device according to one aspect of the present invention.

FIG. 2 illustrates an example schematic view of an MSADU device 50 according to one aspect of the invention. One can use a series of such MSADUs 50 along with the switching unit 15 to build an MDM device as shown in FIG. 1. The MSADU unit is shown as regions 60 representing an ADU waveguide, and the bus 70. The regions of the MSADU depicted as regions $r_1$, $r_2$, $r_3$ are the components of the MSADU device design. The regions labeled $r_1$, $r_2$ and $r_3$ are alternately referred to herein as the width-changer region, the staged coupling region and the quasi phase matching region, respectively. Furthermore, the regions that connect the region $r_2$ to the region $r_3$ and vice versa are called the transition regions.

Region $r_1$ acts as a continuous width-changer. It transfers the power from the fundamental mode of the input waveguide to the fundamental mode of the ADU waveguide 60. Depending on the mode MSADU is designed for, region $r_1$ may increase or decrease the width of the ADU waveguide compared to the input waveguide. An associated design parameter for this region, the width of the ADU waveguide is called $\omega_a^x$ as shown in FIG. 2. This concept can also be applied to change the width of the bus waveguide which is defined by $\omega_b^x$ as shown in FIG. 2.

Region $r_2$ of the MSADU 50 provides the main coupling between the ADU waveguide power and the bus power. Region $r_2$ has two associated design parameters: its length or the coupling length, referred to as $L_c$; and, the distance between the ADU waveguide and the bus referred to as distance d. Although the MSADU 50 shown in FIG. 2 is shown with only two coupling regions $r_2$ for illustrative purposes, in general, an MSADU device 50 may have any number of coupling regions $r_2$ (hence, the name staged coupling).

Region $r_3$ is the quasi phase matching region formed between every two coupling regions $r_2$. One function of region $r_3$ is to reset the relative phase between the electromagnetic wave (EMW) in the ADU waveguide 60 and the bus 70 after the coupling such that the next coupling has maximum efficiency. The design parameter for this region, the length of the quasi phase matching region, is referred to as $L_r$.

Figure 3:
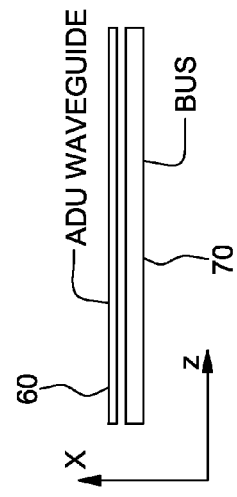
FIG. 3 illustrates the close coupling between an ADU waveguide and the bus for power transfer according to one embodiment of the present invention.
Figure 4:
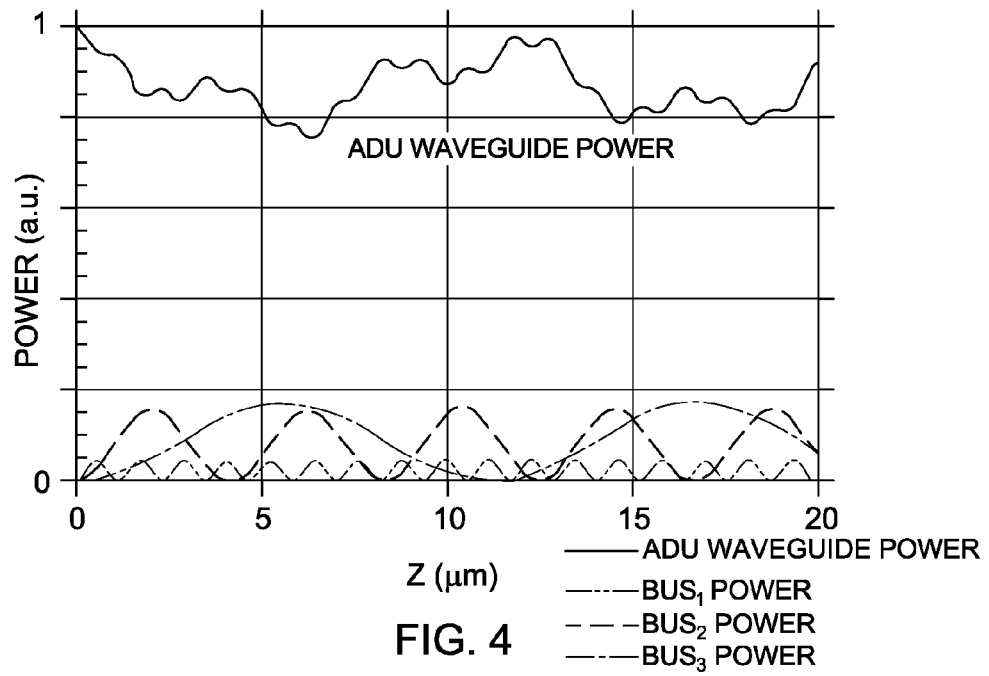
FIG. 4 illustrates a plot of an example ADU waveguide power as well as mode powers for the three different modes in the bus according to an example embodiment.

For non-limiting purposes of illustration only, it is assumed that the example bus 70 can carry three modes. As shown in FIG. 3, to produce the conditions for mode coupling of optical signals, the ADU waveguide 60 and bus are disposed parallel and close enough in distance d. By launching a signal into the fundamental mode of the waveguide 60 along the z-direction, some of the waveguide power will be transferred from fundamental mode of the ADU waveguide to various modes of the bus and vice versa. The amount of this power transfer changes along the coupling length (e.g., z-direction). A plot 61 of the ADU waveguide power and the mode powers for the three different modes labeled $BUS_1$, Power $BUS_2$, Power, $BUS_3$ Power as a function of the distance along the coupling length, z, in the bus, is shown in FIG. 4. In the example depicted, the power in all $BUS_1$, $BUS_2$, and $BUS_3$ modes of the bus are oscillating with roughly the same amplitude.

In an example application, an MSADU device 50 is configured for transferring power between the second mode of the bus, e.g., $BUS_2$ Power in FIG. 4, and the fundamental mode of the ADU waveguide 60. Then, by modifying the region $r_1$ in the MSADU structure the MSADU behavior is altered, e.g., as shown in the example plot of FIG. 4, to a desired behavior shown by the plot 62 in FIG. 5 after design and optimization of region $r_1$.

Figure 5:
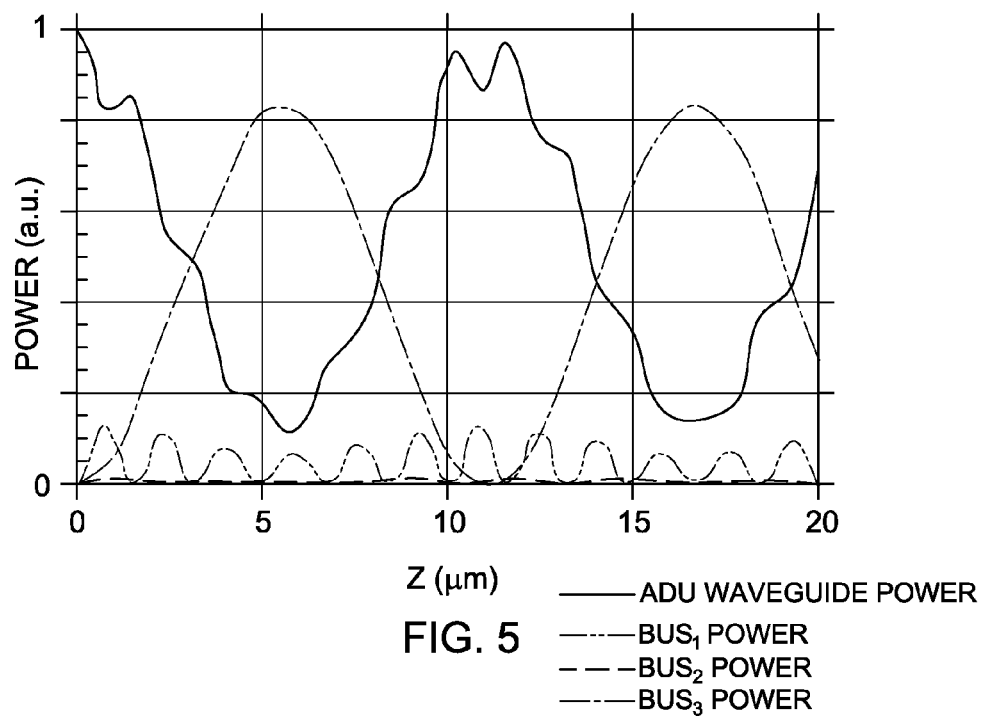
FIG. 5 illustrates a plot of the example ADU waveguide power and mode powers for three different modes in the bus resulting from changing the width of the ADU waveguide in accordance with an example embodiment.

Specifically, by changing the width of the ADU waveguide 60, the coupling coefficient between different modes in the bus and the ADU waveguide is adjusted. This way, the power transferred to the desired mode of the bus (e.g., $BUS_2$ Power shown in the plot of FIG. 4) is significantly larger than the power transferred at the other modes. Note that still all these powers are oscillating along the coupling length; however, the maximum power is transferred in the desired mode (e.g., $BUS_2$ Power mode as shown in FIG. 5) by separating the ADU waveguide and the bus at the location where desired mode power is maximum (For instance, at a distance z=5.3 µm along the length of the bus in FIG. 5 along z axis).

Modifying width changer region $r_1$ alone, as shown in FIG. 2, may not lead to 100% power transfer to the desired mode; however, it facilitates the process of complete power transfer using regions $r_2$ and $r_3$. A method is now described for designing and optimizing region $r_1$ so that the response of the MSADU shown in the plot 62 FIG. 5 from FIG. 4 is attained. For example, if the bus is separated from the ADU waveguide at the right coupling length (e.g. z=5.3 µm in the example shown in FIG. 5), a maximum power transfer to the desired mode is achieved. Thus, a first aspect of the design of the first coupling stage is setting its coupling length as will be described in greater detail herein below. However, as it can be seen from FIG. 5, the power transfer achieved after one coupling stage may not be satisfactory as the power transfer to the desired mode (e.g., the $BUS_2$ Power, for example) of the bus is considerably less than 20 dB. To achieve larger of power transfer, more than one coupling stage can be used as will be described in greater detail herein below.

Figure 6:
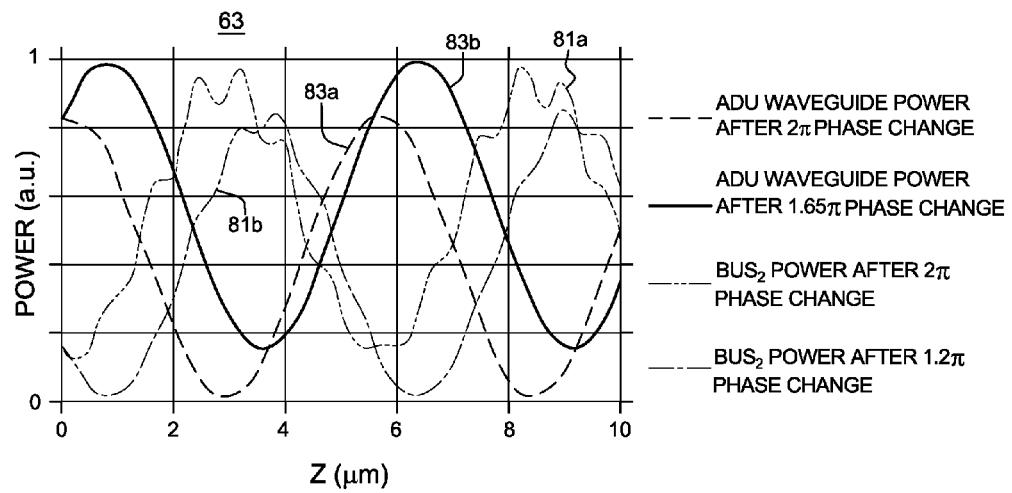
FIG. 6 illustrates an effect of a quasi phase matching region depicting an example ADU waveguide power and power in the second mode of the bus during a second coupling stage in accordance with an example embodiment of the MSADU device.

Region $r_3$, or the quasi phase matching region, functions to set the right phase relation between the two coupling EMWs in the ADU waveguide and the bus. FIG. 6 illustrates a plot 63 of an effect of the quasi phase matching region $r_3$ only the ADU waveguide power and the power in the second mode of the bus along the coupling length z during a second coupling stage is shown. The plots indicated by dashed lines represent the second coupling stage after $2\pi$ phase change for the EMW in both the ADU waveguide 81 and the bus 83a. The solid plots represent the second coupling stage after $1.2\pi$ phase change in the bus EMW and $1.6\pi$ of phase change in the ADU waveguide EMW represented as signal 81b. It is noted that ultimate maximum power in the desired $2^{nd}$ mode of the bus is significantly larger in the latter case ($1.2\pi$ phase change in the bus EMW shown as plot 83b in FIG. 6), where as the former case ($2\pi$ phase change in the bus EMW shown as plot 83a in FIG. 6) only appears to be a continuation of the first coupling stage without any increase in the power in the desired mode of the bus (compare the dashed plots 81a, 83a in FIG. 6 with their corresponding plots in FIG. 5). Also, it is observed that both scenarios in FIG. 6 (dashed plots vs. solid plots) start from the same initial power. Thus, the quasi phase matching region does not add or remove any power from the ADU waveguide; rather, it only re-aligns the EMW in both ADU waveguide and bus for another round of optimum power transfer. The details of the design and optimization of quasi phase matching regions is described in greater detail herein below.

Figure 7:
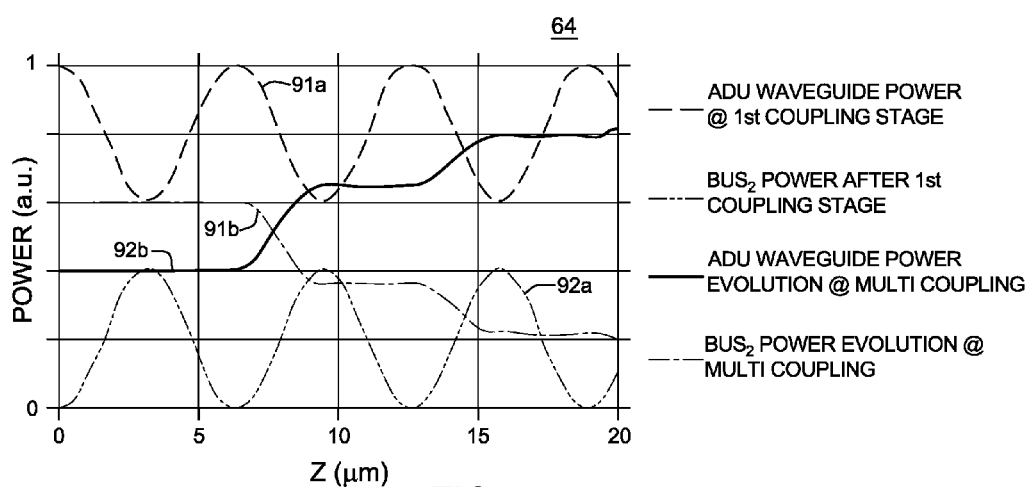
FIG. 7 illustrates a plot of the example ADU waveguide power of an example embodiment, depicting waveguide power and the power in an example second mode of the bus.

FIG. 7, for purposes of description, illustrates an example plot 64 showing the ADU waveguide power and the power in a particular mode of the bus, e.g., the second mode of the bus, along the first coupling length (signals 91a, 92a represented by dashed plot) and along the whole ADU waveguide length (solid plots labeling signals 91b, 92b) of the example embodiment. The dashed power plots 91a and 92a of ADU waveguide and bus, respectively, is transferred along the first coupling stage. The solid power plots 91b, 92b show how power of ADU waveguide and bus, respectively, is transferred along the whole MSADU device. The curved regions represent the coupling stages and the straight regions represent the quasi phase matching regions. Note that the quasi phase matching regions are designed such that coupling at each coupling stage happens with maximum efficiency. If it is assumed a power coupling coefficient of $0<k<1$ from the ADU waveguide, $P^{ADU}$, to the second mode of the bus, $P^{bus}$, then after "n" coupling stages, $P_n^{bus}$ results as shown in equation 1):

$$P_n^{bus} = \sum_{i=0}^{n} k(1-k)^i P_0^{ADU}, \quad (1)$$
$$= P_0^{ADU}[1-(1-k)^{n+1}]$$

where $P_0^{ADU}$ is the initial power in the ADU waveguide before any coupling. Note that as n or the number of coupling stages increases, $P^{bus}$ gets closer to $P_0^{ADU}$ and consequently $P^{ADU}$ approaches zero. This in turn means 100% power transfer is approached.

It should be understood that it may be required to change the coupling length and or quasi phase matching length from one stage to the other to account for the power that is accumulating in unwanted modes of the bus. By using a finite number of coupling stages, there is achieved a balance between the power transfer rate (e.g., about 20 dB) and the spectral band of the device (e.g., about 60 nm). As shown in FIG. 7, the curved regions of the power plot represent the coupling stages and the straight regions represent the quasi phase matching regions of the MSADU device. Although the length of the quasi phase matching regions are shown in FIG. 7 to be equal for all quasi phase matching regions and also the same for the bus and the ADU waveguide, it is understood that these lengths may vary.

The amplitude of the electric field for all admissible (i.e., guided) modes along different regions of the MSADU device is determinable. Specifically, two regions are considered: (i) where the ADU waveguide and the bus are well separated and thus the EMW spatial distribution in each section can be analyzed separately and independently, and (ii) where ADU waveguide and the bus are close to each other and thus the EMW spatial distribution is calculated for both structures simultaneously. In the following, reference to the parameters associated with the first (second) region are denoted by an index "s" (index "c", respectively).

The electric field amplitude calculation, whether performed numerically or analytically, provides outcomes including: $\rho_a^n$, $E_a^n(x)$, $\beta_b^n$, $E_b^n(x)$, $\beta_c^n$ and $E_c^n(x)$ where E is the electric field along the z=0 plane and "x" is the spatial coordinates of such plane; $\beta$ is the propagation constant. The index "a" refers to the ADU waveguide when it is far away from the bus and hence coupling between the two is neglected (these electric fields are referred to along with those of the next item together with index "s" too). The index "b" refers to the bus when it is far away from the ADU waveguide and hence coupling between the two is neglected (these electric fields are referred to along with those of the previous item together with index "s" too). The index "c" refers to both ADU waveguide and bus in the coupling region where the ADU waveguide and the bus are relatively close to each other. The superscript "n" refers to the integer corresponding to the EMW mode. Thus, $n_a$, $n_b$ and $n_c$ represent the total number of guided modes in the ADU waveguide, the bus and the combination of the ADU waveguide and the bus in the coupling region, respectively. It is noted that "E" and "x" are 2D vectors. Finally, all these electric fields are normalized to result in equation 2) as follows:

$$\int_A [\hat{E}_\alpha^n(x)]^2 dx = \frac{\pi \upsilon \mu_0}{\sqrt{\beta_\alpha^n \beta_\alpha^m}} \delta_{m,n} \quad (2)$$

where "A" is the region z=0, $\alpha \in \{a, b, c\}$, $\upsilon$ is the frequency of the light in the waveguides, $\mu_0$ is the permeability of the vacuum and $\delta_{m,n}=1$ if m=n and zero otherwise. There are many standard methods for calculating the electric field distribution and the propagation constant based on the ADU waveguide and bus design geometry and material.

Given availability of a specific design geometry and material, the electric field and the propagation constant are readily calculated. Thus, the total electric field in a region $\alpha$ may be written using equation 2) as follows:

$$\hat{E}_\alpha(x) = \sum_{k=1}^{n_\alpha} \phi_\alpha^k \hat{E}_\alpha^k(x) \quad (3)$$

where, $\alpha \in \{a, b, c\}$ and $\phi_a^k \in \mathbb{C}$ are appropriate modal coefficients depending on the specific distribution of the electric field among various modes. In the derivation of equation (3), it is assumed without loss of generality and for simplicity of presentation only that $\hat{E}_\alpha(x)$ can always be written as a sum of guided modes; i.e. negligible coupling into leaky and radiation modes.

There is now introduced the notation for $\hat{E}_s^k$ according to equation 3) as follows:

$$\hat{E}_s^k = \begin{cases} \hat{E}_a^k & 1 \leq k \leq n_a, \\ \hat{E}_b^{k-n_a} & n_a < k \leq n_s \end{cases} \quad (4)$$

where $n_s = n_a + n_b$. There is also defined $\phi_s^k$ using $\phi_a^k$ and $\phi_b^k$ similar to the definition of $\hat{E}_s^k$ in equation 4). It is observed that the $\phi$ coefficients change as the wave propagates in the z direction. In particular, in any of the scenarios discussed above (a, b or c) as long as the conditions mentioned thereafter hold and provided the values of the $\phi$ coefficient at some z value is provided, the values of these modal coefficients are found at any other z values along the direction of propagation of the wave according to equation 5) as follows:

$$\Phi_\alpha^k(z_2) = \Phi_\alpha^k(z_1(\exp[-i\beta_\alpha^k(z_2-z_1)], \quad (5)$$

where $\alpha \in \{a, b, c, s\}$ and $k \in \{1 \ldots n_a\}$. A vector functions $B_\alpha(z)$: $\Re \to \Re^a$ and $\Phi_\alpha(z)$: $\Re \to \Re^a$ is further defined according to equation 6) as follows:

$$B_\alpha(z) = [\exp[-i\beta_\alpha^1(z)] \ldots \exp[-i\beta_\alpha^{n_a}(z)]]$$

$$\Phi_\alpha(z) = [\phi_\alpha^1(z) \ldots \phi_\alpha^{n_a}(z)]. \quad (6)$$

where $\alpha \in \{a, b, c, s\}$.

To consider the transition between the scenario "s" and "c", (i.e. when bus and ADU waveguide are far away and when the two are close to each other), there is obtained equations 7) and 8) as follows:

$$\Phi_s = \Phi_c T \quad (7)$$

where $T$ is an $n_c \times n_s$ matrix according to:

$$T_{k,l} = \int_A \hat{E}_c^k(x) \hat{E}_s^l(x) \, dx. \quad (8)$$

Based on the particular modes under consideration, during the transition from scenario "s" to "c" (or vice versa), some of the power may be lost. This is because not all the electric field distribution can be expressed in terms of available modes. Electric field amplitudes and the propagation constants depend on the geometry and material of the structures at hand. As explained, there are many methods to calculate the electric field distribution and the propagation constant for all admissible modes of a structure. Both the ADU waveguide and the bus are fabricated as regions with higher refractive index (n) compared to the low index medium as known to a person skilled in the art. One embodiment is to fabricate the ADU waveguide and the bus using standard semiconductor fabrication techniques from silicon (n=3.40) such that it sits on top of silicon dioxide (n=1.45) and inside air (n=1) as shown in FIG. 15 for region "c" or $r_2$. FIG. 15 shows a cross sectional view of an ADU waveguide and bus together in the coupling region "c" (case c). The wider waveguide shown in FIG. 15 is the bus 70 and the other waveguide is the ADU waveguide 60. For exemplary purposes, it is noted that in this example, $n_a=1$, $n_b=4$ and $n_c=n_s=5$. In an example to be considered as described in greater detail herein below, $\lambda=1.5$ μm in vacuum. In the coupling region of the example embodiment depicted where the bus and the ADU waveguide are close together, the region 62, is air with a refractive index of n=1, a dielectric region 65 at y<0, in one embodiment, is silicon dioxide with n=1.45, and the silicon waveguide structure 70 has a refractive index of n=3.40. The height of both waveguides are $\omega_a^y = \omega_b^y = 0.22$ μm, the gap between the two waveguides is d=0.2 μm, the ADU waveguide width is $\omega_a^x = 0.4$ μm and finally the bus width is $\omega_b^x = 1.2$ μm in an example embodiment.

Figure 8:
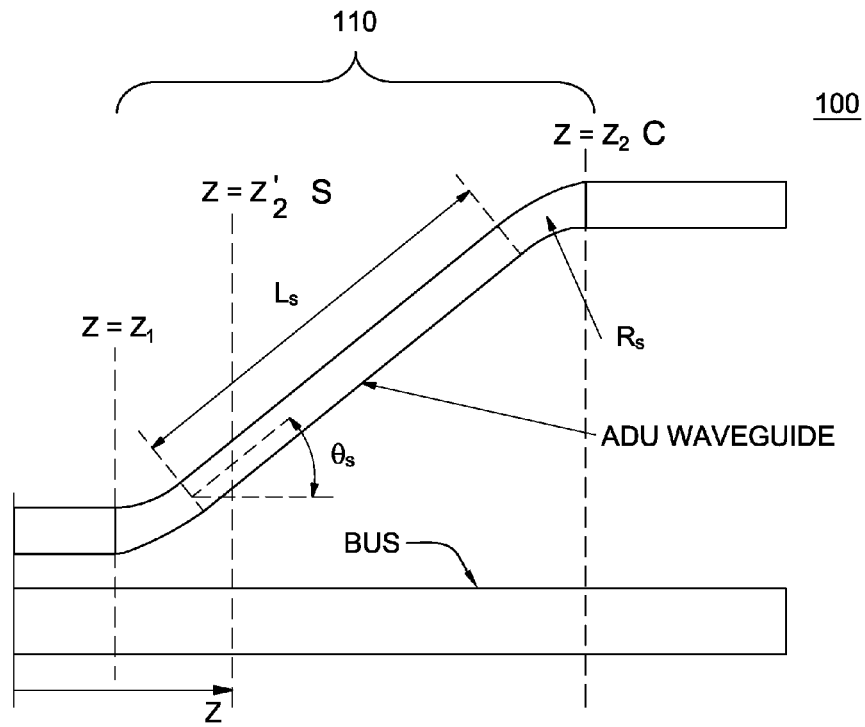
FIG. 8 shows a schematic diagram of an example transition region 110 between the separated and coupled configurations (i.e. between staged coupling and quasi phase matching regions) in accordance with an example embodiment of the MSADU device.

In a further embodiment, the optical ADU waveguide comprises a polymer material, the polymer optical ADU waveguide having one of constant or variable shape along its length. Notwithstanding the physical configuration of the MSADU device (whether formed of glass, semiconductor or polymer materials), a plurality of input waveguides can be coupled to, i.e., enter the waveguide, for transferring an optical signal from an input optical waveguide into a multi-mode waveguide When considering the transition region and specifically in Eq. (7), the coupling that happens when $z_1 \leq z \leq z_2$ as shown in FIG. 8 is accounted for. FIG. 8 shows a schematic diagram 100 of the transition region 110 between the separated and coupled configurations (or quasi phase matching and stage coupling regions). That is, FIG. 8 shows an s-shaped transition region 110 which can be fully described with the three variables $L_s$, $R_s$ and $\theta_s$.

One way of accounting for the transition region 110 shown in FIG. 8 is to define an effective coupling length $L_c$ for this region. This effective coupling length is then considered during the design of the staged coupling region. One formula that can be used for an s-shape connecting region is according to equation 9) as follows:

$$L_c^s = R^s \sin(\gamma) \quad (9)$$

where $R_s$ is the radius of the curvature of the curved region of an s-shape region (as shown in FIG. 8) and $\gamma$ is an angle that is found through calibration and represents an angle found such that the power coupling between the ADU waveguide and the bus by coupling along the s-shaped region with radius $R_s$ is equal to the power coupling between the ADU waveguide and the bus by coupling along the straight region with length $L_c^x = R_s \sin(\gamma)$. It is understood that the actual value of γ depends on many factors such as width and height of the ADU waveguide and the bus, the gap between the two, the angle θ as well as the modes present in the bus and the ADU waveguide. Semiconductor fabrication techniques may be implemented for manufacturing the transition, coupling and quasi phase matching regions such as described in the reference to Y. Vlasov, W. M. J. Green, and F. Xia entitled "High-throughput silicon nanophotonic wavelength-insensitive switch for on-chip optical networks", Nature Photonics, 2:242-246, 2008 incorporated by reference as if fully set forth herein.

The radius of curvature and the angle of the s-shape can be chosen based on the size of the ADU waveguide so that the electric field can continuously change direction and propagate through the ADU waveguide. If these changes happen too fast, a lot of the power is transferred to the leaky modes and is lost. Also the $L_s$ in FIG. 8 is chosen long enough to ensure no coupling exists between the ADU waveguide and the bus in the region $z > z_2$ in FIG. 8 where any power transfer between the two is negligible. For purposes of description, while the s-shape connecting region shown in FIG. 8, it is understood that there are many other options available for a transition region 110 such as full semi-circles and exponential curves.

A design and technique for optimization of an MSADU device is now provided in accordance with the present invention. As mentioned with respect of FIG. 2, the width-changer region transfers the signal from the input waveguide to the ADU waveguide. This transfer is from the fundamental mode of the input waveguide to the fundamental mode of the ADU waveguide. There are two main design parameters for a width-changer region: (i) The output width or simply the ADU waveguide width ($\omega_a^x$), and (ii) the profile of the width-changer region or more specifically, the function by which the width is varied from the input waveguide to the ADU waveguide. Clearly, the main design parameter is $\omega_a^x$ as it affects the fundamental properties of the MSADU device. The detailed process of the design and optimization of $\omega_a^x$ is now provided.

Figure 9:
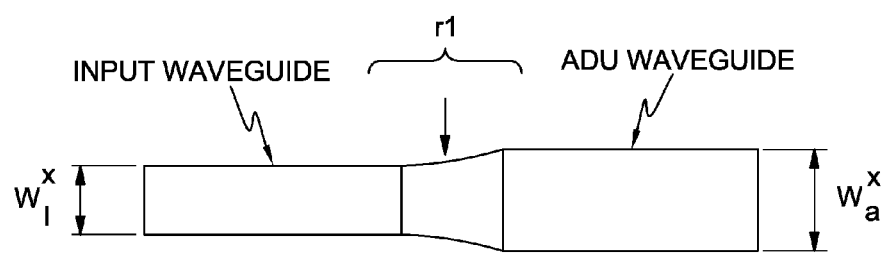
FIG. 9 shows the schematic view of a width-changer region of an example embodiment of the MSADU device having a width chosen such that by varying widths of the ADU waveguide or bus or both, a mode of the ADU waveguide and a mode of interest in the bus are as close to resonant as possible for maximal power transfer.
Figure 10:
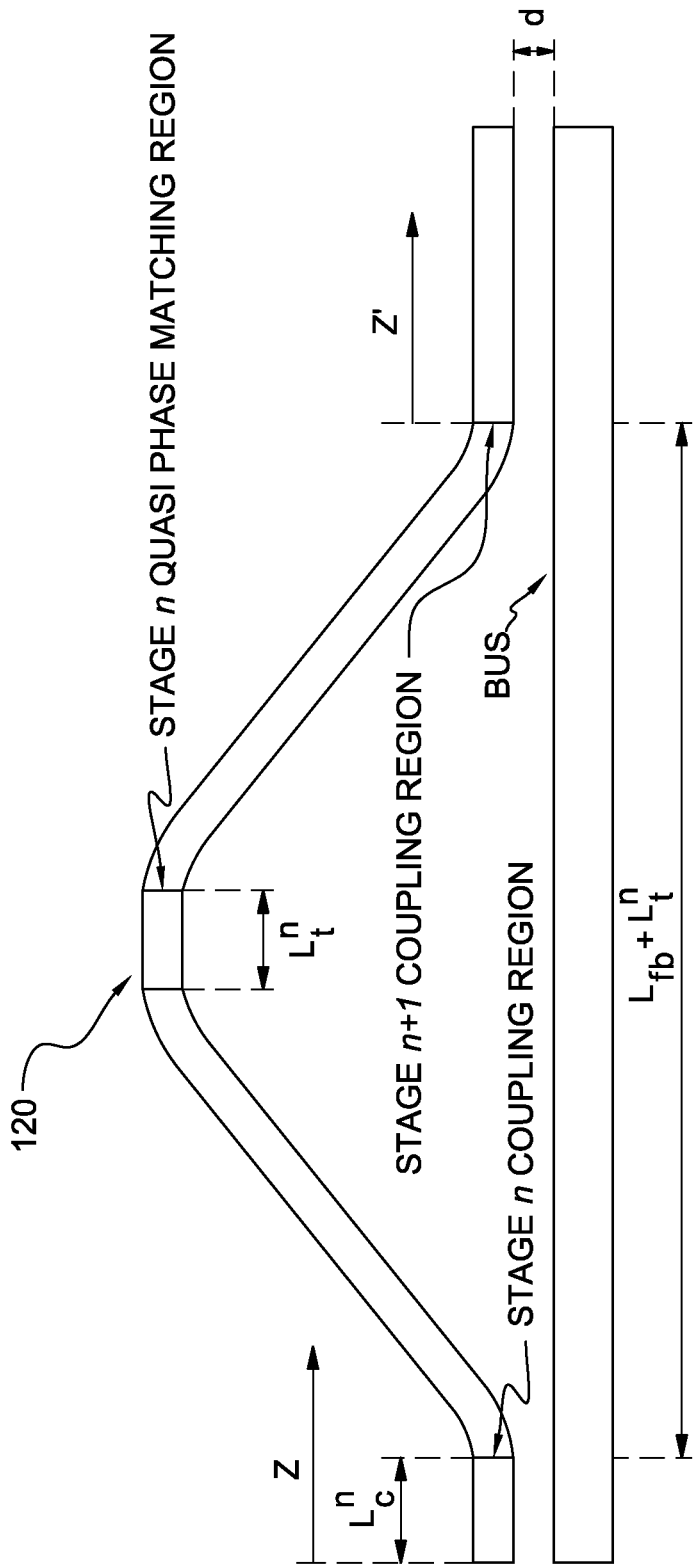
FIGS. 10 and 11 depict two methods 120, 130 respectively, for designing a quasi phase matching region of an example embodiment of the MSADU device.

More particularly, FIG. 9 shows the schematic view of a width-changer region $r_1$. It is observed that the wave inside the input waveguide is carried by the fundamental mode and after going through the width-changer region, it will be transferred to the fundamental mode of the ADU waveguide. As such, a width of the width-changer region is chosen such that a mode of the ADU waveguide and the mode of interest in the bus ($1 \leq m \leq n_b$) are as close to resonant as possible, for maximal power transfer, while simultaneously minimizing the power supplied into the other modes of the bus. Ideally the power would oscillate between these two modes along the z direction and all other mode will have zero power. Thus, this criteria is chosen as one optimization. Accordingly, the power distribution is expressed in terms of the ADU waveguide and bus modes during separation (or quasi phase matching) as shown in equation (10) as follows:

$$\Phi_s(z) = \Phi_c(z)T \qquad (10)$$
$$= [1, 0 \ldots 0]T^{-1}B_c(z)T$$

where z is the distance measured from the beginning of the coupling region. In one embodiment, the optimization problem is defined in accordance with equation 11) as follows:

$$\tilde{w}_a^x(d_k, \lambda_l) = \underset{w_a^x \in [w_{min}, w_{max}]}{\operatorname{argmin}} \left\{ \sum_{i \in I} \left( \sum_{k=1,l=1}^{n_c} \left[ T_{1,k}^{-1} T_{k,i} T_{1,l}^{-1} T_{l,i} \int_\theta^{2\pi/\bar{\beta}_c} [B_c^k(z) B_c^l(z)^*] dz \right] \right) \right\} \qquad (11)$$

where the transfer matrix T and the scalars $\beta_c^1 \ldots \beta_c^{n_c}$ are functions of $\omega_a^x$, $d^\kappa$ (i.e., the gap_____ between ADU waveguide and bus as shown in FIG. 10), and $\lambda_l$. Additionally, $I=\{1 \ldots n_s\}-\{1, m+n_a\}$ and $\bar{\beta}_c=\max\{\beta_c^1 \ldots \beta_c^{n_c}\}$. The final value for the width of the ADU waveguide is computed according to equation 12) as follows:

$$w_a^* = \frac{1}{N_1 N_2} \sum_{n=1}^{N_1} \sum_{l=1}^{N_2} \tilde{w}_a(d_k, \lambda_l) \qquad (12)$$

where $N_1$ is the number of different gap values under consideration and $N_2$ is the number of different wavelength values under consideration.

Once the ADU waveguide's width is set, then in the next step the method includes choosing a profile for the width changer. The important factors for the profile are continuity in width and its first and second derivatives. Furthermore, all these three have to remain continuous at the boundaries (i.e. at the end of the input waveguide and at the beginning of the ADU waveguide). There are many possible functions that can satisfy these requirements (e.g. polynomials, trigonometric, logarithmic, exponentials etc.). All of the above teachings may also be applied to design a width-changer region for the bus waveguide.

In a further aspect of the invention, there is provided optimizing of the staged coupling and quasi phase matching regions to transfer the maximum power to the $m^{th}$ mode of the bus over the spectral range of $[\lambda_1, \lambda_{N2}]$. It is understood that the design methodology of these regions is the same for other mode transfers. In general, there is a quasi phase matching region between every two staged coupling regions (e.g., regions n, n+1). The design and optimization algorithm for the staged coupling region and the quasi phase matching region that follow it, may be combined.

Figure 11:
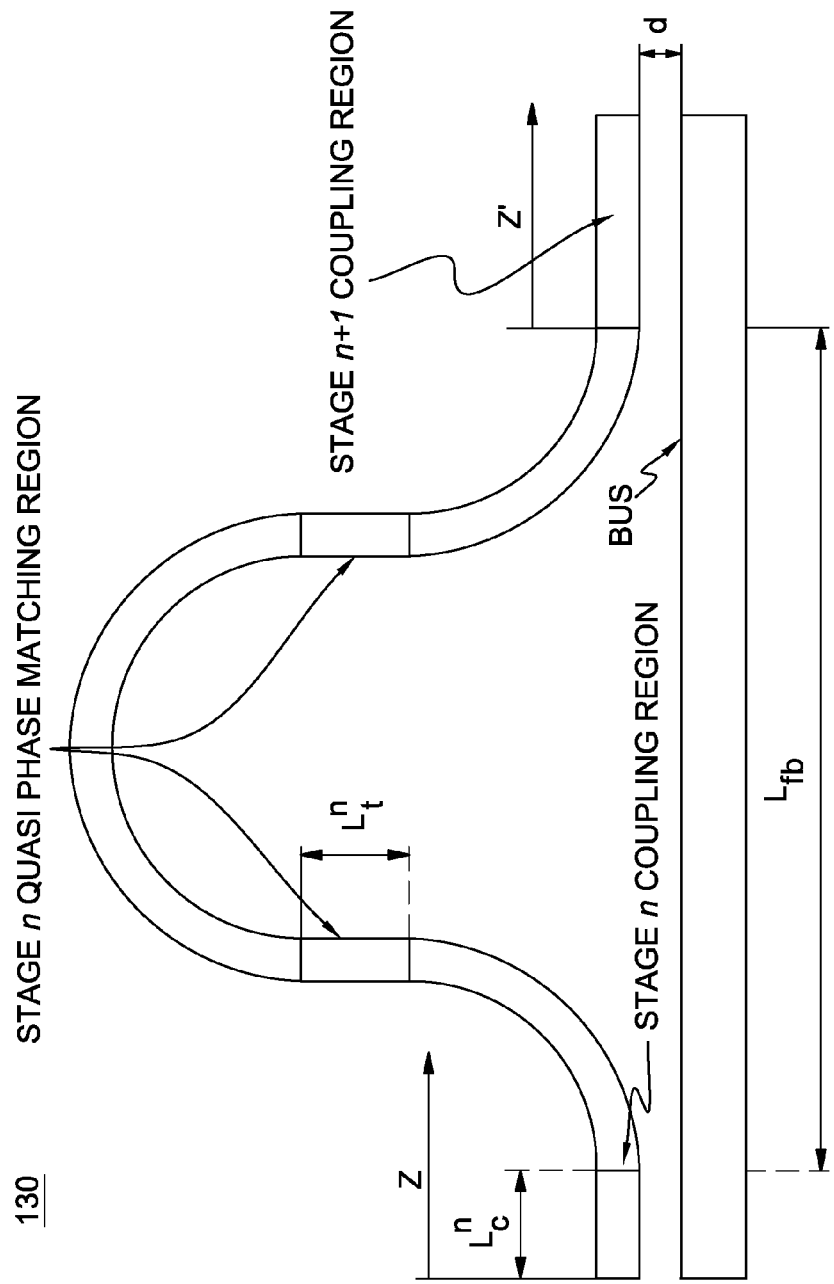

Two methods that can be used for designing a quasi phase matching region are shown in FIGS. 10 and 11. In one method, shown in FIG. 10, the quasi phase matching region design 120 controls the combination of the absolute and relative phase at which the bus's EMW and the ADU waveguide's EMW meet during the next coupling stage (e.g., $(n+1)^{th}$ coupling stage). This is accomplished by allowing equal free propagation of the EMW in both the ADU waveguide and the bus (in FIG. 10) as the variable in this design (i.e. the length of the region labeled "quasi-phase matching region") equally changes the length of both ADU waveguide and the bus. Consequently the only difference in the relative phase is due to the potentially different propagation constants for different modes.

In the other method, shown in FIG. 11, the quasi phase matching region design 130 controls the relative phase between the bus's EMW and the ADU waveguide's EMW when they meet during the next coupling stage while the absolute phase of the bus EMW is constant. This is because the length of the bus does not change in this design and the only variable in the length of the ADU waveguide as shown in the figure by the label "quasi-phase matching region". These two design scenarios may be combined to result in a design that controls a mixture of absolute and relative phase.

A design method for the quasi phase matching region shown in FIG. 10 now follows. It is first assumed that the $\Phi$ coefficients at the ADU waveguide and the bus before the start of the $n^{th}$ coupling stage, are provided. The z coordinate is as shown in FIG. 10; then, the known $\Phi$ coefficients can be thought of as $\Phi_s(0)$. Then there is assigned $L_c^n$ to the length of the coupling site. It is understood that the $L_c^n$ is unknown and an optimum value for this variable is to be found.

Thus, there is calculated $\Phi_c(L_c^n)=\Phi_s(0)T^{-1}\beta_c(L_c^n)^T$ and, using a transform, the $\Phi$ coefficients after the coupling region is calculated according to equation 13) as follows:

$$\Phi_s(L_c^n)=\Phi_s(0)T^{-1}\beta_c(L_c^n)^T T \qquad (13)$$

After the coupling region is passed, the ADU waveguide and the bus are separated and the evolution of the EMW in each branch is different. Thus, modal coefficients $\Phi_b$ and $\Phi_a$ are calculated as follows:

$$\Phi_b(L_{fb}+L_t^n+L_c^n)=\Phi_b(L_c^n)IB_b(L_{fb}+L_t^n),$$

$$\Phi_a(L_{fa}+L_t^n+L_c^n)=\Phi_a(L_c^n)IB_a(L_{fa}+L_t^n)$$

where $L_{fa}+L_t^n$ is the distance the light in the ADU waveguide travels from the end of the $n^{th}$ coupling region to the beginning of the $(n+1)^{th}$ coupling region and where $L_{fb}+L_t^n$ is the distance the light in the bus travels from the end of the $n^{th}$ coupling region to the beginning of the $(n+1)^{th}$. It is understood the $L_t^n$, is unknown and an optimum value can be determined for this variable. The values of $L_{fa}$ and $L_{fb}$ depends on the structure design of the MSADU device and is constant across the whole MSADU device. Letting $\Phi'_c(z')$ represent the modal coefficients of the coupled modes of the ADU waveguide and the bus with z'=0 as shown in FIG. 9, there is calculated in equation 14):

$$\Phi'_c(0)=[\Phi_a(L_{fa}+L_t^n+L_c^n), \Phi_b(L_{fb}+L_t^n+L_c^n)]T^{-1} \qquad (14)$$

Then, from $\Phi'_c(z')$ and assuming stopping at the $(N+1)^{th}$ coupling region at an arbitrary z', the $\Phi$ coefficients for the ADU waveguide and the bus when they are separated are calculated in accordance with equation 15):

$$\Phi'_s(z')=\Phi_s(0)T^{-1}[B_c(L_c^n)^T T[B_a(L_{fa}+L_t^n), B_b(L_{fb}+L_t^n)] \\ T^{-1}B_c(z')^T T \qquad (15)$$

In one aspect, as it is an objective of the staged coupling and quasi phase matching regions is to transfer the maximum power to the $m^{th}$ mode of the bus, the optimization problem to maximize this power is shown as equation 16) as follows:

$$[\tilde{L}_c^n(\lambda_l), \tilde{L}_t^n(\lambda_l)] = \underset{L_c^n \in [L_c^{min}, L_c^{max}], L_t^n \in [0, L_t^{max}]}{\operatorname{argmin}} \quad (16)$$

$$\left\{ \underset{z' \in [0, 2L_c^{max}]}{\min} [\Phi_s'(z') \cdot \Phi_s'(z')^* - \phi_s'^{n_a+m}(z')\phi_s'^{n_a+m}(z')^*] \right\}$$

where the transfer matrix T and β values are functions of $\lambda_l$ which have been pre-calculated, for example, using standard simulation methods or software known to a person skilled in the art including, but not limited to, Finite-Difference Time-Domain technique (FDTD) methods, beam propagation methods, eigen-mode expansion methods, etc., and, where $L_c^{min}$ and $L_c^{max}$ are minimum and maximum allowable values for $L_c$ based on geometrical limitation due to fabrication, size, etc., and, $L_t^{max}$ is a maximum allowable value for $L_t$ based on geometrical limitation due to fabrication, size, etc. and Φ represents modal coefficients depending upon the electric field distribution among various modes, and z' is a distance along the direction of wave propagation. The dependence of the optimization objective on $L_c^n$ and $L_t^n$ is explicit in the statement of the objective as shown in equation (15). The final optimal values of the staged coupling length and the quasi phase matching length are calculated according to equation 17) as:

$$[L_c^n, L_t^n]^* = \frac{1}{N_2} \sum_{l=1}^{N_2} [\tilde{L}_c^n(\lambda_l), \tilde{L}_t^n(\lambda_l)] \quad (17)$$

In a further aspect, the design algorithm is slightly different for the last staged coupling region because it is not followed by a quasi phase matching region. Thus, to maximize the power in the desired mode at the end of the staged coupling region, the following equation 18) is applied:

$$\tilde{L}_c^n(\lambda_l) = \quad (18)$$
$$\underset{L_c^n \in [L_c^{min}, L_c^{max}]}{\operatorname{argmin}} \{\Phi_s(L_c^n) \cdot \Phi_s(L_c^n)^* - \phi_s^{n_a+m}(L_c^n)\phi_s^{n_a+m}(L_c^n)^*\}$$

where $\Phi_s$ is given by equation (13). The final optimum value for the staged coupling region is computed according to equation 19) as follows:

$$[L_c^n]^* = \frac{1}{N_2} \sum_{l=1}^{N_2} \tilde{L}_c^n(\lambda_l) \quad (19)$$

In a further embodiment, it may also be desirable to apply some form of apodization to the coupling regions, in order to window the degree of coupling along each stage in the MSADU device. Apodization in the present invention is described in the reference entitled: "Widely tunable integrated filter/receiver with apodized grating-assisted codirectional coupler" by YuHeng Jan, Gregory A. Fish, Larry A. Coldren, and Steven P. DenBaars in Proc. SPIE 3290, 258 (1997), the contents and disclosure being incorporated as if fully set forth herein. Apodization of the coupling regions provides many beneficial effects, including broadened spectral response, improved tolerance to fabrication errors, and reduced sensitivity to changes in device operating temperature. An example of a method to control the apodization of the coupling regions is by manipulating the size of the gap.

In an example application, an MSADU device is designed and optimized according to the principles of the invention to transfer the input optical signal power from a first waveguide to a fourth mode of the bus. The bus width and the input waveguide width are fixed at $\omega_b^x = 1200$ nm and $\omega_i^x = 200$ nm. Additionally, the height of all waveguides are fixed at $\omega_a^y = 220$ nm where $\alpha \in \{a, b, i\}$. The width changer, staged coupling and quasi phase matching regions are designed using the methods discussed of the invention. The optimum value for designed variables are shown in Table 1 as follows:

TABLE 1

| Param. | Value | Unit |
|---|---|---|
| $w_a^x$ | 520 | nm |
| d | 200 | nm |
| $(L_c^1, L_t^1)$ | (9.3, 9.8) | μm |
| $(L_c^2, L_t^2)$ | (20.2, 9.8) | μm |
| $L_c^3$ | 31.8 | μm |

For the example MSADU device design where total power transfer is between the input waveguide and the fourth mode of the bus, FIG. 12A shows the evolution of the power in various modes of the ADU waveguide and the bus along the MSADU device with powers shown in decimal scale. FIG. 12B shows the evolution of the power in various modes of the ADU waveguide and the bus along the MSADU device with powers shown in log scale for the example application. All the mode powers in this figure are normalized to the launch power. A low amount of cross-talk between modes is exhibited by the device as shown in the log plot shown in FIG. 12B.

For the example MSADU device design where total power transfer is between the input waveguide and the fourth mode of the bus when the bus is already carrying an optical signal at another bus mode, e.g., the first mode, FIG. 13A shows the evolution of the power in various modes of the ADU waveguide and the bus along the MSADU device with powers in FIG. 13A shown in decimal scale. FIG. 13B shows the evolution of the power in various modes of the ADU waveguide and the bus along the MSADU device for the example application when the bus is already carrying an optical signal at another bus mode, e.g., the first mode, with powers shown in log scale. All the mode powers in this figure are normalized to the launch power. Note the low cross-talk between modes in log plot shown in FIG. 13B.

FIG. 14A shows the spectral response (with powers shown in decimal scale) of the optimized MSADU device for the example MSADU device design where total power transfer is between the input waveguide and the fourth mode of the bus as described with respect to FIGS. 12A, 12B. FIG. 14b shows the spectral response (with powers shown in log scale). As it is clear from the spectral response of the example FIG. 14B, the spectral range for which the power transfer rate is more than 20 dB is centered around the design wavelength (e.g., λ=1.5 μm) and has a finite width.

FIG. 16 depicts an example application showing intensity distributions 300 of a) the fundamental mode carried by the ADU waveguide 310; and, respectively, b)-d) corresponding to modes 1, 2, and 3 of a respective bus waveguide 320a, 320b, 320c (i.e. bus). The arrows 301a, 301b, and 301c depict mode-division de/multiplexing of an input signal into one of the various modes of the bus, using the functionality of an MSADU device of the invention. Thus, for example, the fundamental mode of optical signal carried on ADU waveguide 310 (shown as white area against a dark background) can be de/multiplexed (301*a*, 301*b*, 301*c*) into any of the modes supported by the wider multimode waveguide bus (320*a*, 320*b*, 320*c*), with an appropriate design of a mode-selective add-drop unit.

FIG. 17 depicts an embodiment in which a MDM device is used as an interface device 200 to a set of external multi-mode input/output waveguides, e.g., waveguide 250*a*. Modes carrying signals within the external multi-mode input waveguide are coupled into the bus waveguide, and separated into various ADU waveguides by the mode-division multiplexing device MDM1 210*a*. Each of these separated signals can then be independently processed within the optical processing region 225, with signal processing functions which can, for example, include optical signal amplification, delay, and wavelength routing. Subsequently, the separated signals can be multiplexed back onto the bus waveguide by MDM2 210*b*, at which point it is also possible to re-sort and re-assign the set of output spatial modes carrying each signal. Finally, the signals are coupled back into an external multi-mode output waveguide 250*b*. The interface device 200 comprising MDM devices 210*a,b* can be fabricated, for instance, as an application-specific photonic integrated circuit.

FIG. 18 depicts an embodiment in which a MDM device is used as an interface device 200' to a set of external multi-mode and/or single-mode input/output waveguides 251. Modes carrying signals within the external multi-mode input waveguide 251 are coupled into the bus waveguide, and separated into various ADU waveguides by the mode-division multiplexing device MDM1 210. Some of the original modes may also remain within the bus waveguide. Each of these separated signals can then be independently processed within the optical processing region 225, with signal processing functions which can for example include amplification, delay, and wavelength routing. Finally, the signals are then coupled back into either an external multi-mode output waveguide 251*a* or an external single-mode waveguide 251*b*. The interface device 200' comprising MDM device 210 can be fabricated, for instance, as an application-specific photonic integrated circuit.

FIG. 19 depicts an embodiment of an interface device 200" coupling an external multi-mode waveguide 252 wherein the waveguide 252 connects simultaneously to two different bus waveguides, each bus waveguide belonging to a separate mode-division multiplexing device 210*a*, 210*b*. The bus waveguides 212*a*, 212*b* may be positioned relative to the mode pattern supported by the external multi-mode waveguide 252, in order to couple only certain external modes or external mode groups into each different bus waveguide. Alternatively, bus waveguides may be positioned in a manner so as to broadcast the optical power carried by the modes in the external multi-mode waveguide across each bus waveguide in a similar fashion. The various bus waveguides may be arranged in any manner with respect to the multi-mode external waveguide, either in a planar or stacked configuration.

In a further embodiment, as described herein above, a design methodology is employed that can be implemented by a computer system for designing the various sections of the MSADU device, i.e., the width changer region and the staged coupling and quasi phase matching regions of an arbitrary mode-selective add-drop unit. The method for designing the width changer region comprises identifying the relevant gap value "d" between the ADU waveguide and bus, identifying the wavelength values and allowable ADU waveguide width for the desired design. Then, there is performed the calculating of the transfer matrices and propagation constants for the guided modes in coupling regions and separation (or quasi phase matching) regions; forming the summation in equation (11) and minimizing this value using an optimizer; that is, minimizing the difference between the desired model power distribution and the actual modal power distribution. Then, the optimum ADU waveguide width is calculated implementing equation (12). Thus, accordingly, the width-changer design methodology can be used to optimize the width changer profile to preserve continuity in the width and its first two derivatives to minimize power loss. Moreover, the width-changer design method may be used to design an mode-selective add-drop unit of any mode-division de/multiplexing device, and additionally, may be used to design the optimal width for power transfer among more than two waveguides. Further, the width-changer design methodology may be used to width-changer design algorithm may be used to optimize against other geometrical and material design variables to enhance power transfer. It should be understood that the algorithm described herein in accordance with this further embodiment, is just one way for achieving the design and device and in no way is the design methodology limited to the specific algorithm as described herein.

Moreover, it is understood that it is also possible to adiabatically change the bus width, $\omega_b^x$ via another width changer region in order to maximize the coupling between the desired mode of the bus and the ADU waveguide.

In a further embodiment, as described herein above, a design methodology is employed that can be implemented by a computer system for designing the staged coupling and quasi phase matching regions of an arbitrary mode-selective add-drop unit. The design methodology comprises identifying the gap value allowable by fabrication tolerance, the optimum ADU waveguide width and the wavelength values relevant to the desired design; calculating the transfer matrices and propagation constants for the guided modes in coupling regions and separation (or quasi phase matching) regions. Then, an iterative process is employed that includes setting or initializing an index "n" of each stage, n=1, and implementing equations (16) and (17) to find the optimum staged coupling length and the optimum quasi change length for the $n^{th}$ stage. Then, there is employed checking the power transfer to the desired mode. If satisfactory the algorithm exits; otherwise, index for stage n is incremented, i.e., set n=n+1, and the previous steps are implemented. It is understood that to find the optimum staged coupling length for the last stage equations (18) and (19) are used. This algorithm may be used to design the mode-selective add-drop unit of any mode-division de/multiplexing device. Further, the staged coupling and quasi phase matching design algorithm may be used to design the optimal coupling for power transfer among more than two waveguides, and, further may be used to optimize against other geometrical and material design variables to enhance power transfer. The staged coupling and quasi phase matching design algorithm may be reduced to only staged coupling or only quasi phase matching design for optimum power transfer among waveguides. It should be understood that the algorithms described herein in accordance with these further embodiments, are just one way for achieving the design and device and in no way is the design methodology limited to the specific algorithms as described herein.

The present invention can be realized as a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded into a computer system, is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing the functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing the functions described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

More specifically, as shown in FIG. 20, a computer system 500 includes one or more processors or processing units 510, a system memory 150, and an address/data bus structure 501 that connects various system components together. For instance, the bus 501 connects the processor 510 to the system memory 550. The bus 501 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 500 includes one or more monitors 519 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 500 additionally includes: computer readable media, including a variety of types of volatile and non-volatile media, each of which can be removable or non-removable. For example, system memory 550 includes computer readable media in the form of volatile memory, such as random access memory (RAM), and non-volatile memory, such as read only memory (ROM). The ROM may include an input/output system (BIOS) that contains the basic routines that help to transfer information between elements within computer device 500, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 501 by one or more data media interfaces (not shown). Alternatively, the hard disk drive, magnetic disk drive, and optical disk drive can be connected to the system bus 501 by a SCSI interface (not shown), or other coupling mechanism. Although not shown, the computer 500 can include other types of computer readable media. Generally, the above-identified computer readable media provide non-volatile storage of computer readable instructions, data structures, program modules, and other data for use by computer 500. For instance, the readable media can store an operating system (O/S), one or more application programs, and/or other program modules and program data for enabling video editing operations via Graphical User Interface (GUI).

Input/output interfaces 545 are provided that couple the input devices to the processing unit 510. More generally, input devices can be coupled to the computer 500 through any kind of interface and bus structures, such as a parallel port, serial port, universal serial bus (USB) port, etc. The computer environment 500 also includes the display device 519 and a video adapter card 535 that couples the display device 519 to the bus 501. In addition to the display device 519, the computer environment 100 can include other output peripheral devices, such as speakers (not shown), a printer, etc. I/O interfaces 545 are used to couple these other output devices to the computer 500.

As mentioned, computer system 500 is adapted to operate in a networked environment using logical connections to one or more computers, such as the server device that may include all of the features discussed above with respect to computer device 500, or some subset thereof. It is understood that any type of network can be used to couple the computer system 500 with a server device, such as a local area network (LAN), or a wide area network (WAN) (such as the Internet). When implemented in a LAN networking environment, the computer 500 connects to local network via a network interface or adapter 529. When implemented in a WAN networking environment, the computer 500 connects to the WAN via a high speed cable/dsl modem 580 or some other connection means. The cable/dsl modem 180 can be located internal or external to computer 500, and can be connected to the bus 501 via the I/O interfaces 545 or other appropriate coupling mechanism. Although not illustrated, the computing environment 500 can provide wireless communication functionality for connecting computer 500 with remote computing device, e.g., an application server (e.g., via modulated radio signals, modulated infrared signals, etc.).

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A method of designing a mode-selective add-drop (MSADU) unit having an optical ADU waveguide for coupling signals from an input optical waveguide to a multi-mode waveguide, the optical ADU waveguide having a region for coupling said input optical waveguide, said method comprising:

specifying a gap value $d_K$ between said optical ADU waveguide and said multi-mode waveguide, a wavelength value $\lambda_l$ and, an allowable optical ADU waveguide width $\omega_a^x$;

calculating one or more transfer matrices and propagation constants for modes in a coupling regions and quasi phase matching region between said optical ADU waveguide and said multi-mode waveguide;

forming a representation of an output width of said ADU waveguide as a function of said calculated one or more transfer matrices and propagation constants for modes in coupling regions and quasi phase matching regions;

minimizing a value of said representation such that a difference between a desired modal power distribution and an actual modal power distribution is minimized;

calculating an optimum ADU waveguide width based on said minimized value; and, optimizing a profile of said coupling region of said ADU waveguide to preserve continuity in the width and at least a first derivative of said profile to minimize power loss, wherein a program using a processor unit executes one or more of said calculating one or more transfer matrices and propagation constants, forming, minimizing, calculating ADU waveguide width, and optimizing.

2. The method as claimed in claim 1, wherein said output width representation is a function governed according to:

$$\tilde{w}_a^x(d_k, \lambda_l) = \underset{w_a^x \in [w_{min}, w_{max}]}{\operatorname{argmin}} \left\{ \sum_{i \in I} \left( \sum_{k=1, l=1}^{n_c} \left[ T_{1,k}^{-1} T_{k,i} T_{1,l}^{-1} T_{l,i} \int_\theta^{2\pi/\bar{\beta}_c} [B_c^k(z) B_c^l(z)^*] dz \right] \right) \right\}$$

where T is the transfer matrix and the scalars $\beta_c^l \ldots \beta_c^{n_c}$ are functions of width $\omega_a^x$ and a gap $d_K$ between ADU and multi-mode waveguide, and $\lambda_l$ the wavelength of the optical signal waveguide mode being transferred.

3. The method as claimed in claim 2, wherein said optimum ADU width is calculated according to:

$$w_a^* = \frac{1}{N_1 N_2} \sum_{n=1}^{N_1} \sum_{l=1}^{N_2} \tilde{w}_a(d_k, \lambda_l)$$

where $N_1$ is the number of different gap values under consideration and $N_2$ is the number of different wavelength values under consideration.

4. A method of designing a mode-selective add-drop (MSADU) unit having an optical ADU waveguide for coupling signals from an input optical waveguide to a multi-mode waveguide, said method comprising:

specifying a gap value $d_K$ between said optical ADU waveguide and said multi-mode waveguide, a wavelength value $\lambda_l$ and, an allowable optical ADU waveguide width $\omega_a^x$;

calculating one or more transfer matrices and propagation constants for modes in coupling regions and quasi phase matching regions between said optical ADU waveguide and said multi-mode waveguide;

forming a representation of a length $L_c$ of a staged coupling region and a length of a phase matching region $L_t$ of said optical ADU waveguide as a function of said calculated one or more transfer matrices and propagation constants for modes in coupling regions and quasi phase matching regions, said staged coupling and phase matching region of said optical ADU waveguide for coupling an optical signal to said multi-mode waveguide at a desired mode to said multi-mode waveguide; and, calculating an optimum value of the staged coupling length $L_c$ and the phase matching length $L_t$ based on a maximized power value to said desired mode of said multi-mode waveguide, wherein a program using a processor unit executes one or more of said calculating one or more transfer matrices and propagation constants, forming, and calculating lengths $L_c$ and $L_t$.

5. The method as claimed in claim 4, wherein said representation of a length $L_c$ of a coupling region and a length of the phase matching region $L_t$ of said ADU waveguide is a summation governed according to:

$$[\tilde{L}_c^n(\lambda_l), \tilde{L}_t^n(\lambda_l)] = \underset{L_c^n \in [L_c^{min}, L_c^{max}], L_t^n \in [0, L_t^{max}]}{\operatorname{argmin}}$$

$$\left\{ \underset{z' \in [0, 2L_c^{max}]}{\min} [\Phi_s'(z') \cdot \Phi_s'(z')^* - \phi_s'^{m_a+m}(z') \phi_s'^{m_a+m}(z')^*] \right\}$$

where $L_c^{min}$ and $L_c^{max}$ are minimum and maximum allowable values for $L_c$ based on geometrical limitation due to fabrication, size, etc., and, $L_t^{max}$ is a maximum allowable value for $L_t$ based on geometrical limitation due to fabrication, size, etc. and $\Phi$ represents modal coefficients depending upon the electric field distribution among various modes, and z' is a distance along the direction of wave propagation.

6. The method as claimed in claim 5, calculating said optimum values of the output staged coupling and phase matching region according to:

$$[L_c^n, L_t^n]^* = \frac{1}{N_2} \sum_{l=1}^{N_2} [\tilde{L}_c^n(\lambda_l), \tilde{L}_t^n(\lambda_l)]$$

where $N_2$ is the number of different wavelength values under consideration.

7. The method as claimed in claim 6, wherein calculating said optimum values comprises:

setting index n=1;

calculating an optimum staged coupling length $L_c$ and the optimum quasi change length $L_t$ for the $n^{th}$ stage;

checking a power transfer to said an $m^{th}$ mode of said multi-mode waveguide;

determining if said power transfer to said $m^{th}$ mode is not optimized, and, if said power transfer is not optimized, setting n=n+1 and returning to said calculating $L_c$ and $L_t$; and, otherwise, if said power transfer to said $m^{th}$ mode is optimized, terminating the calculating.

8. The method as claimed in claim 7, wherein calculating said optimum values comprises:

calculating an optimum staged coupling length for the last stage according to $$\tilde{L}_c^n(\lambda_l) = \underset{L_c^n \in [L_c^{min}, L_c^{max}]}{\operatorname{argmin}} \{\Phi_s(L_c^n) \cdot \Phi_s(L_c^n)^* - \phi_c^{n_a+m}(L_c^n) \phi_s^{n_a+m}(L_c^n)^*\}.$$

9. The method as claimed in claim 7, wherein calculating said optimum values comprises:

calculating an optimum staged coupling length for the last stage according to:

$$[L_c^n]^* = \frac{1}{N_2} \sum_{l=1}^{N_2} \tilde{L}_c^n(\lambda_l).$$

10. A non-transitory computer program product for designing a mode-selective add-drop unit (MSADU) having an optical ADU waveguide for coupling signals from an input optical waveguide to a multi-mode waveguide, the computer program product comprising:

a storage medium readable by a processing circuit and storing instructions for execution by the processing circuit for performing a method comprising:

specifying a gap value $d_\kappa$ between said optical ADU waveguide and said multi-mode waveguide, a wavelength value $\lambda_l$ and, an allowable optical ADU waveguide width $\omega_a^x$;

calculating one or more transfer matrices and propagation constants for modes in coupling regions and quasi phase matching regions between said optical ADU waveguide and said multi-mode waveguide;

forming a representation of a length $L_c$ of a staged coupling region and a length of a phase matching region $L_t$ of said optical ADU waveguide as a function of said calculated one or more transfer matrices and propagation constants for modes in coupling regions and quasi phase matching regions, said staged coupling and phase matching region of said optical ADU waveguide for coupling an optical signal to said multi-mode waveguide at a desired mode to said multi-mode waveguide; and, calculating an optimum value of the staged coupling length $L_c$ and the phase matching length $L_t$ based on a maximized power value to said desired mode of said multi-mode waveguide.

11. A non-transitory computer program product for designing a mode-selective add-drop unit (MSADU) having an optical ADU waveguide for coupling signals from an input optical waveguide to a multi-mode waveguide, the optical ADU waveguide having a region for coupling said input optical waveguide, the computer program product comprising:

a storage medium readable by a processing circuit and storing instructions for execution by the processing circuit for performing a method as claimed in claim 1.

* * * * *